United States Patent
Hano

(10) Patent No.: US 9,543,865 B2
(45) Date of Patent: Jan. 10, 2017

(54) DEVICE FOR DRIVING THREE-PHASE BRUSHLESS MOTOR

(71) Applicant: HITACHI AUTOMOTIVE SYSTEMS, LTD., Hitachinaka-shi, Ibaraki (JP)

(72) Inventor: Masaki Hano, Isesaki (JP)

(73) Assignee: HITACHI AUTOMOTIVE SYSTEMS, LTD., Hitachinaka-Shi, Ibaraki (JP)

( * ) Notice: Subject to any disclaimer, the term of this patent is extended or adjusted under 35 U.S.C. 154(b) by 0 days.

(21) Appl. No.: 15/023,189

(22) PCT Filed: Sep. 19, 2014

(86) PCT No.: PCT/JP2014/074843
§ 371 (c)(1),
(2) Date: Mar. 18, 2016

(87) PCT Pub. No.: WO2015/041321
PCT Pub. Date: Mar. 26, 2015

(65) Prior Publication Data
US 2016/0233803 A1    Aug. 11, 2016

(30) Foreign Application Priority Data
Sep. 20, 2013 (JP) .................. 2013-195178

(51) Int. Cl.
*H02P 6/00* (2016.01)
*H02P 6/18* (2016.01)
*H02P 27/08* (2006.01)

(52) U.S. Cl.
CPC .......... *H02P 6/18* (2013.01); *H02P 6/182* (2013.01); *H02P 21/32* (2016.02); *H02P 27/08* (2013.01)

(58) Field of Classification Search
CPC .............. H02P 1/46; H02P 1/50; H02P 3/18; H02P 6/00; H02P 23/00; H02P 25/00; H02P 27/00
(Continued)

(56) References Cited

U.S. PATENT DOCUMENTS 5,254,918 A    10/1993 Ueki
5,350,987 A    9/1994 Ueki
(Continued)

FOREIGN PATENT DOCUMENTS

JP    04-046583 A    2/1992
JP    2001-275387 A    10/2001
(Continued)

*Primary Examiner* — Antony M Paul
(74) *Attorney, Agent, or Firm* — Foley & Lardner LLP

(57) ABSTRACT

The present invention allows a driving device, which drives a three-phase brushless motor in a sensorless manner, to detect an initial position of the brushless motor and start drive of the motor without performing positioning processing. In a device for driving a brushless motor by sequentially switching six energizing modes, in which two phases to be energized are selected out of three phases, energization is performed sequentially in six energizing modes before start of drive so that the motor does not rotate, and each induced voltage of an opened phase is acquired, induced voltage difference is obtained in each predetermined combination of energizing modes, and it is estimated to which one of six divided regions an initial position of the brushless motor corresponds based on a maximum value of induced voltage differences obtained.

15 Claims, 26 Drawing Sheets

(58) Field of Classification Search
USPC ............ 318/400.01, 400.02, 400.07, 400.11,
318/400.14, 400.15, 689, 700, 701, 721,
318/799, 800, 801, 430, 805, 811, 599,
318/432, 400.32, 400.34, 400.4; 363/40,
363/44, 95, 120; 388/800, 819, 823
See application file for complete search history.

(56) References Cited

U.S. PATENT DOCUMENTS

| | | | |
|---|---|---|---|
| 8,258,732 B2 * | 9/2012 | Iwaji | ........................ H02P 6/20 |
| | | | 318/400.01 |
| 8,884,575 B2 | 11/2014 | Takahata et al. | |
| 2001/0045812 A1 | 11/2001 | Seki et al. | |
| 2001/0050542 A1 | 12/2001 | Seki et al. | |
| 2002/0079860 A1 | 6/2002 | Seki et al. | |
| 2007/0229004 A1 | 10/2007 | Fukamizu et al. | |
| 2012/0306416 A1 | 12/2012 | Hano | |
| 2013/0272899 A1 | 10/2013 | Takahata et al. | |

FOREIGN PATENT DOCUMENTS

| | | |
|---|---|---|
| JP | 2007-236062 A | 9/2007 |
| JP | 2009-189176 A | 8/2009 |
| JP | 2012-106638 A | 6/2012 |
| JP | 2012-253844 A | 12/2012 |
| JP | 2013-223355 A | 10/2013 |

* cited by examiner

《DIFFERENCE Sa30: MODE1-MODE3》

《DIFFERENCE Sa90: MODE4-MODE2》

《DIFFERENCE Sa150: MODE3-MODE5》

《DIFFERENCE Sa210: MODE6-MODE4》

《DIFFERENCE Sa270: MODE5-MODE1》

《DIFFERENCE Sa330: MODE2-MODE6》

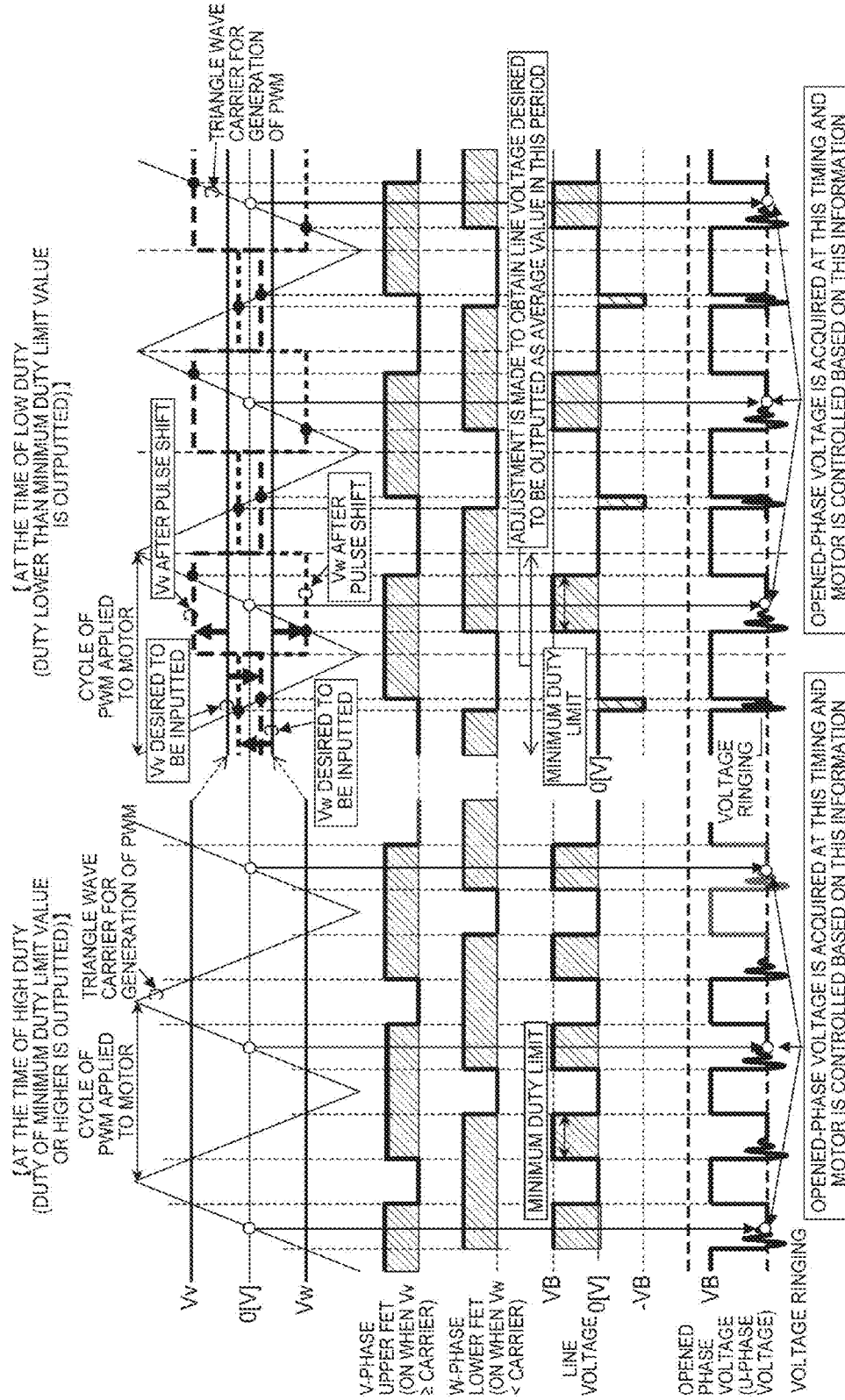

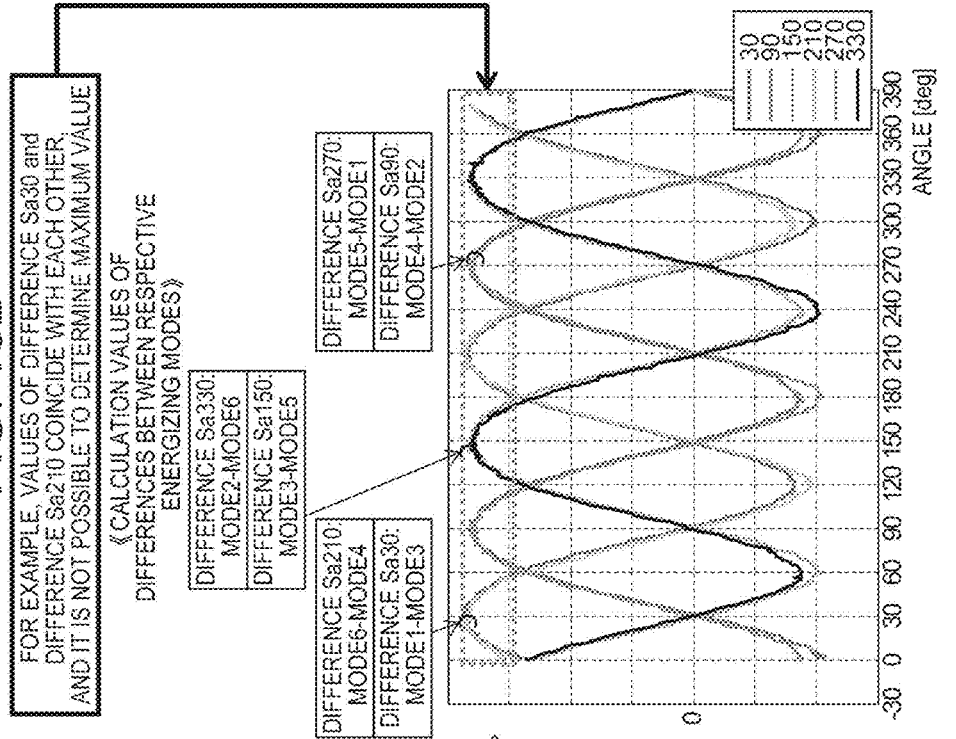
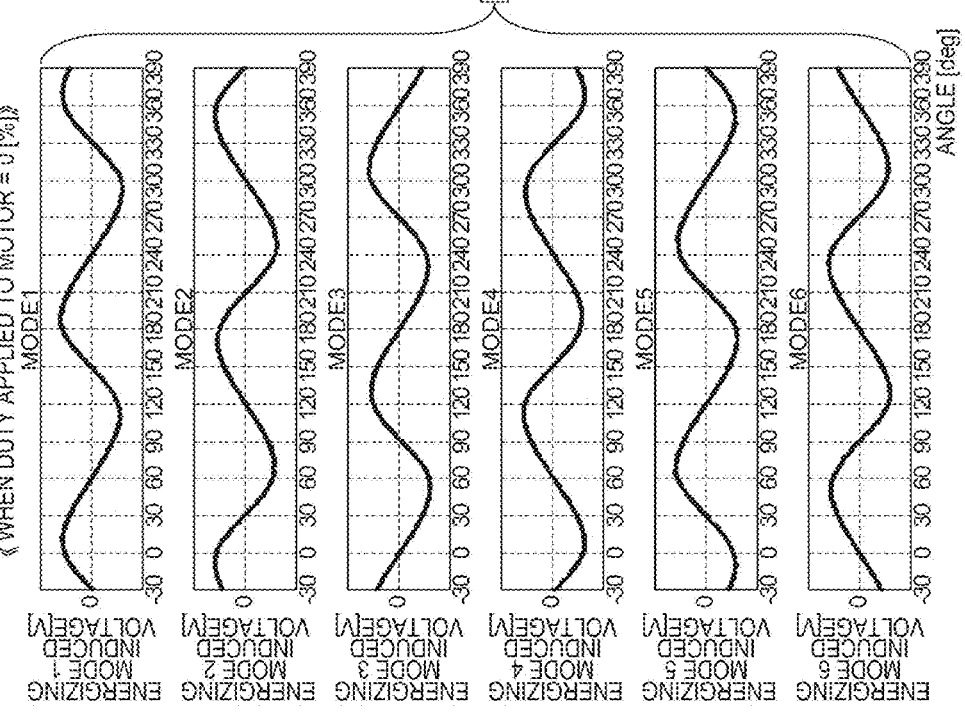

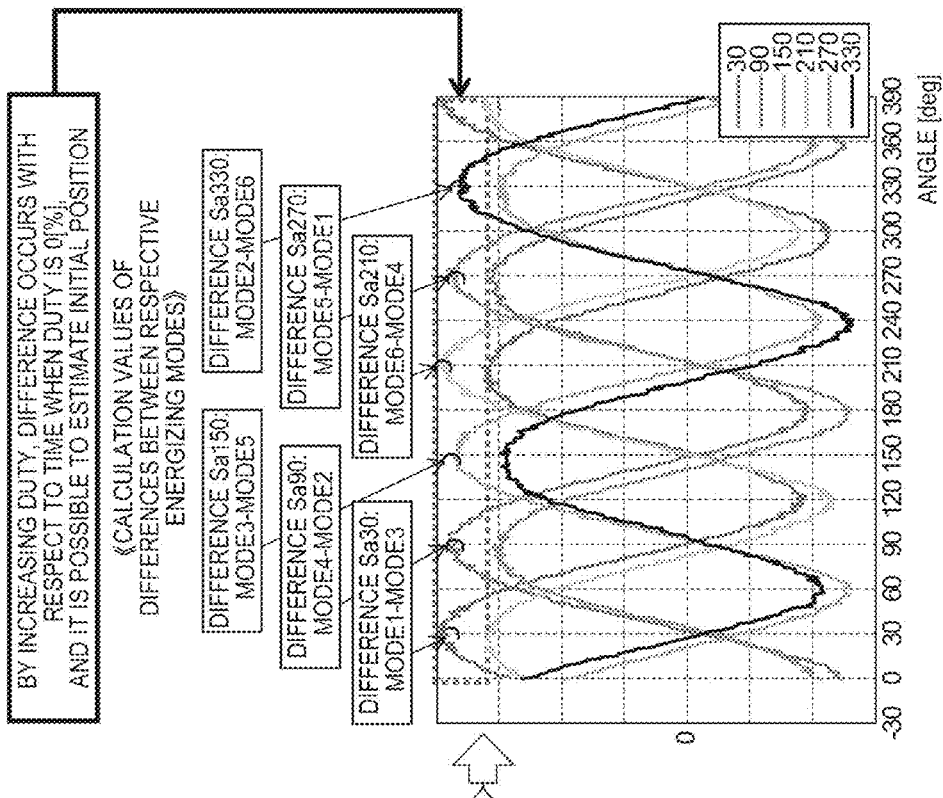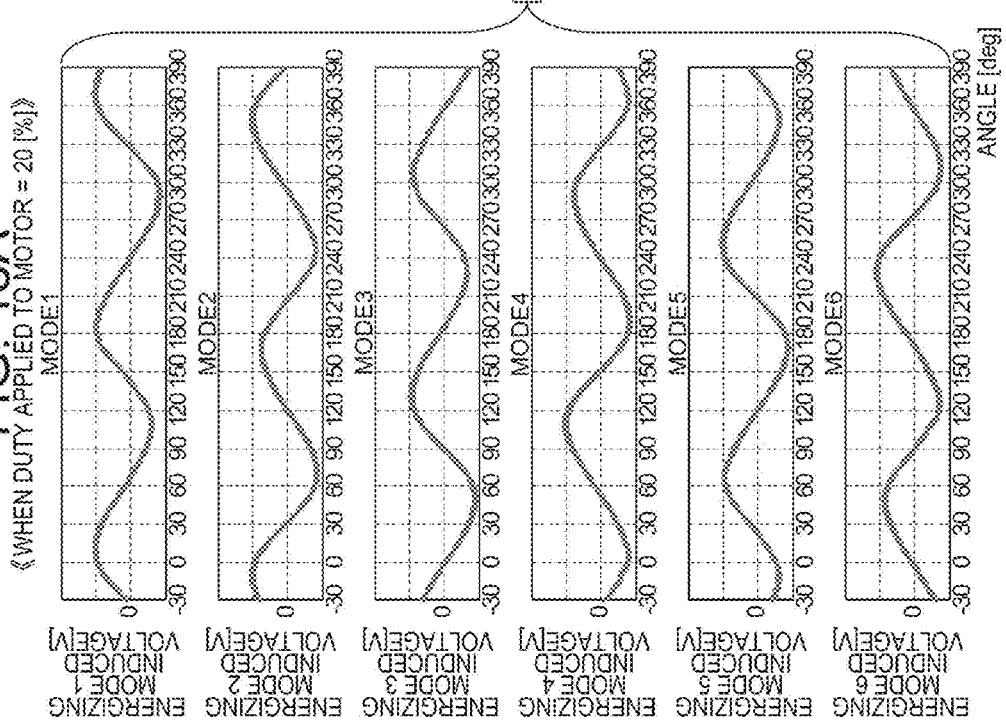

《CALCULATION VALUES OF DIFFERENCES BETWEEN RESPECTIVE ENERGIZING MODES》

DEVICE FOR DRIVING THREE-PHASE BRUSHLESS MOTOR

TECHNICAL FIELD

The present invention relates to a device for driving a three-phase brushless motor, and, in detail, relates to a technology of detecting an initial position of a three-phase brushless motor.

BACKGROUND ART

Patent Document 1 discloses sensorless control in a driving device that drives a three-phase brushless motor by switching six energizing modes in which two phases to be energized are selected out of three phases of the three-phase brushless motor, the sensorless control switching the energizing modes sequentially in accordance with a result of comparison between terminal voltage and reference voltage of a non-energized phase.

REFERENCE DOCUMENT LIST

Patent Document

Patent Document 1: Japanese Patent Application Laid-open Publication No. 2009-189176

SUMMARY OF THE INVENTION

Problems to be Solved by the Invention

In a case in which a brushless motor is driven by sensorless control, it is necessary to understand a magnetic pole position (an initial position of the motor) and determine an energizing mode, and there are instances in which, for example, positioning processing is performed, in which a freely selected phase is energized before the drive starts so as to fix the magnetic pole position to a predetermined position.

However, in the positioning processing, since the motor is rotated to a predetermined initial position and stopped, there has been a problem that it takes a long time until the positioning processing ends (until the motor stops) when inertia of the motor is large, thereby causing a delay of actual start of the drive in response to a motor driving request.

The present invention has been accomplished in light of the above-mentioned problem, and an object thereof is to provide a device for driving a three-phase brushless motor, which is able to detect (estimate) an initial position of the brushless motor and start drive of the motor without performing positioning processing.

Means for Solving the Problems

Therefore, in the invention of the application, energization is performed between one phase, and the rest of two phases out of three phases of a brushless motor so that current in the one phase becomes positive and negative, and an initial position of the brushless motor is detected based on a difference between induced voltage of an opened phase when the current in the one phase becomes positive, and induced voltage of an opened phase when the current in the one phase becomes negative.

Effects of the Invention

According to the abovementioned invention, since a level of the induced voltage difference changes depending on a magnetic pole position, it is possible to estimate a position at which the brushless motor is stopped (initial position) based on the induced voltage difference, thereby making it possible to start drive of the motor responsively without performing positioning processing.

BRIEF DESCRIPTION OF THE DRAWINGS

FIG. 14A and FIG. 14B are time charts for explaining pulse shift control for performing energization with a minimum duty ratio for detection of induced voltage according to the first embodiment of the present invention;

FIG. 15A and FIG. 15B are views for explaining characteristics of induced voltage differences when an average duty is lowered in the pulse shift control according to the first embodiment of the present invention;

FIG. 18A and FIG. 18B are views for explaining characteristics of induced voltage differences when an average duty is increased in pulse shift control according to the first embodiment of the present invention;

MODE FOR CARRYING OUT THE INVENTION

Embodiments of the present invention are explained hereinbelow.

Figure 1:
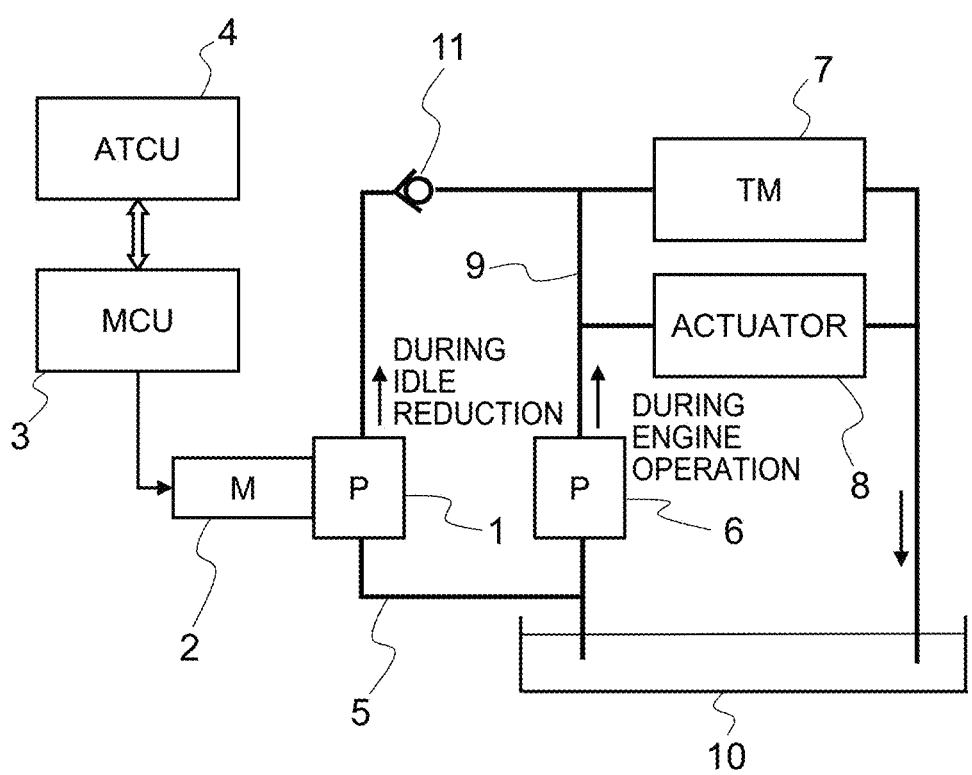
FIG. 1 is a block diagram illustrating a structure of a hydraulic pump system according to the first embodiment of the present invention.

FIG. 1 illustrates an example in which a device for driving a brushless motor according to the present invention is applied as an example to a brushless motor that structures a hydraulic pump system of an automatic transmission for a vehicle.

The hydraulic pump system illustrated in FIG. 1 is provided with a mechanical oil pump 6 driven by an output of an non-illustrated engine (internal combustion engine), and an electric oil pump 1 driven by a brushless motor 2, serving as oil pumps that supply oil to a transmission (TM) 7 and an actuator 8.

Then, electric oil pump 1 is operated when, for example, the engine is stopped by an idle reduction (in short, when mechanical oil pump 6 is stopped) and thereby supplies oil to transmission 7 and actuator 8, to suppress a decrease in oil pressure during the idle reduction.

Brushless motor (three-phase synchronous motor) 2 that drives electric oil pump 1 is controlled by a motor control unit (MCU) 3 serving as a driving device.

Motor control unit 3 controls drive of brushless motor 2 based on a command from an AT control unit (ATCU) 4.

Electric oil pump 1 supplies oil in an oil pan 10 to transmission 7 and actuator 8 via an oil pipe 5.

During operation of the engine, mechanical oil pump 6 driven by the engine is operated, so that oil is supplied from mechanical oil pump 6 to transmission 7 and actuator 8. At that time, brushless motor 2 is in an off state (stopped state), and a check valve 11 cut off the flow of the oil towards electric oil pump 1.

Meanwhile, when the engine is temporarily stopped by idle reduction, mechanical oil pump 6 is stopped, so that oil pressure is decreased in an oil piping 9. Therefore, when the engine is stopped by idle reduction, AT control unit 4 sends a motor start-up command to motor control unit 3.

Motor control unit 3 that has received the motor start-up command starts up brushless motor 2 to rotate electric oil pump 1, and starts oil supply under pressure by electric oil pump 1.

Then, when a discharge pressure of electric oil pump 1 exceeds a set pressure while a discharge pressure of mechanical oil pump 6 decreases, check valve 11 opens, so that oil circulates through a route of oil piping 5, electric oil pump 1, check valve 11, transmission 7, actuator 8, and oil pan 10.

The aforementioned hydraulic pump system of an automatic transmission for the vehicle is an example of a system to which a brushless motor is applied, and a driving device according to the invention of the application is applicable to various systems in which a brushless motor is used as an actuator.

For example, the brushless motor may be a brushless motor that drives an electric water pump used for circulating cooling water for an engine in a hybrid vehicle and others, and the equipment driven by a brushless motor is not limited to the oil pump. The brushless motor is not limited to a motor installed in the vehicle.

Figure 2:
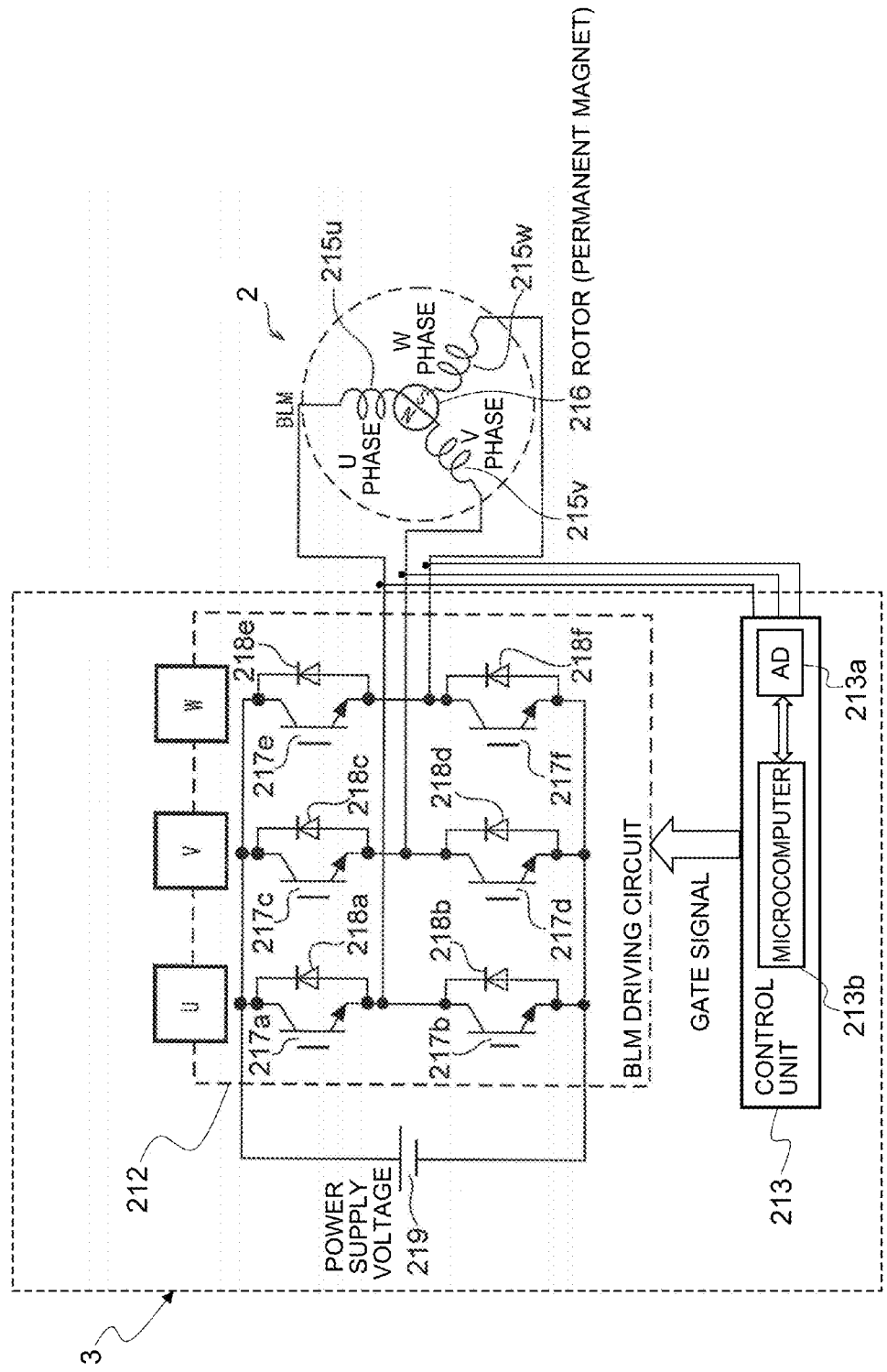
FIG. 2 is a circuit diagram illustrating structures of a motor control unit and a brushless motor according to the first embodiment of the present invention.

FIG. 2 is a circuit diagram illustrating examples of brushless motor 2 and motor control unit 3.

Motor control unit 3, which is a driving device that drives brushless motor 2, is provided with a motor driving circuit 212 and a control unit 213. Control unit 213 performs communications with AT control unit 4. Control unit 213 includes an A/D converter 213a, and a microcomputer 213b provided with a microprocessor (CPU, MPU, and so on).

Brushless motor 2 is a three-phase DC brushless motor, which includes star-connected three-phase winding wires 215u, 215v, 215w in a U phase, a V phase, and a W phase on cylindrical stator whose illustration is omitted, and includes a permanent magnet rotator (rotator) 216 that is rotatable in a space formed in a central of the stator.

Motor driving circuit 212 has a circuit in which switching elements 217a~217f including antiparallel diodes 218a~218f are three-phase bridge connected, and also has a power supply circuit 219. Switching elements 217a~217f are formed of, e.g., FETs.

Control terminals (gate terminals) of switching elements 217a~217f are connected to control unit 213, and control unit 213 controls ON and OFF of switching elements 217a~217f by pulse width modulation (PWM), thereby controlling voltage applied to brushless motor 2.

In PWM control, timing to turn on and off each of switching elements 217a~217f is detected by comparing between a value of a PWM timer set to a triangle wave and a PWM timer setting value that is set in accordance with a command duty ratio (command pulse width).

Control unit 213 performs the drive control of brushless motor 2 in a sensorless manner, in which a sensor obtaining position information about the rotator is not used, and further performs switching a sensorless drive between a sine wave drive and a rectangular wave drive in accordance with a motor rotation speed.

The sine wave drive is a manner of driving brushless motor 2 by applying a sine wave voltage to each phase. In this sine wave drive, the position information of the rotator is derived from the induced voltage (speed-induced voltage) generated by rotation of the rotator. Also, during a detection period of the rotator position according to the speed-induced voltage, the rotator position is estimated based on the motor rotation speed. A three-phase output setting value is calculated from the estimated rotator position and a PWM duty, so that the direction and the intensity of electric current are controlled according to a phase-to-phase difference in voltage, to thereby allow a three-phase alternating current to flow to each phase.

Also, the rectangular wave drive is a manner of driving brushless motor 2 by sequentially switching a selection pattern (energizing mode) of two phases, to which pulse voltage is applied, out of three phases, at each predetermined rotor position.

In this rectangular wave drive, position information of the rotator is obtained from voltage (transformer-induced voltage, pulse-induced voltage) induced in a non-energized phase due to application of pulse-like voltage to an energized phase, and an angular position that represents switching timing of the energizing mode is detected.

In the above, an output level of the speed-induced voltage measured for the position detection in the sine wave drive decreases as the motor rotation speed decreases, and therefore the accuracy of position detection is decreased in the region of a low rotation speed. On the other hand, a pulse induced voltage measured for the position detection in the rectangular wave drive can be detected even in the region of the low rotation speed including the motor-stopped state, and therefore, the accuracy of position detection can be maintained even in the region of the low rotation speed.

Thus, control unit 213 controls brushless motor 2 by the sine wave drive in the region of a high rotation speed in which the sine wave drive allows detection of the position information with a sufficient accuracy, namely, in a region in which a motor rotation speed is higher than a setting value.

Control unit 213 controls brushless motor 2 by the rectangular wave drive in the region of the low rotation speed in which the sine wave drive does not allow detection of the position information with a sufficient accuracy. In the region of the low rotation speed, in which the sine wave drive does not allow detection of the position information with a sufficient accuracy, a region in which the motor rotation speed is lower than the setting value, and motor start-up time are included.

Further, control unit 213 determines a duty ratio of PWM control in accordance with, for example, a deviation between a detection value of the motor rotation speed and a target motor rotation speed in PWM control of brushless motor 2, and makes actual motor rotation speed closer to the target motor rotation speed.

Herein below, a drive control of brushless motor 2 in the rectangular wave drive, which is carried out by control unit 213, is described in detail.

Figure 3:
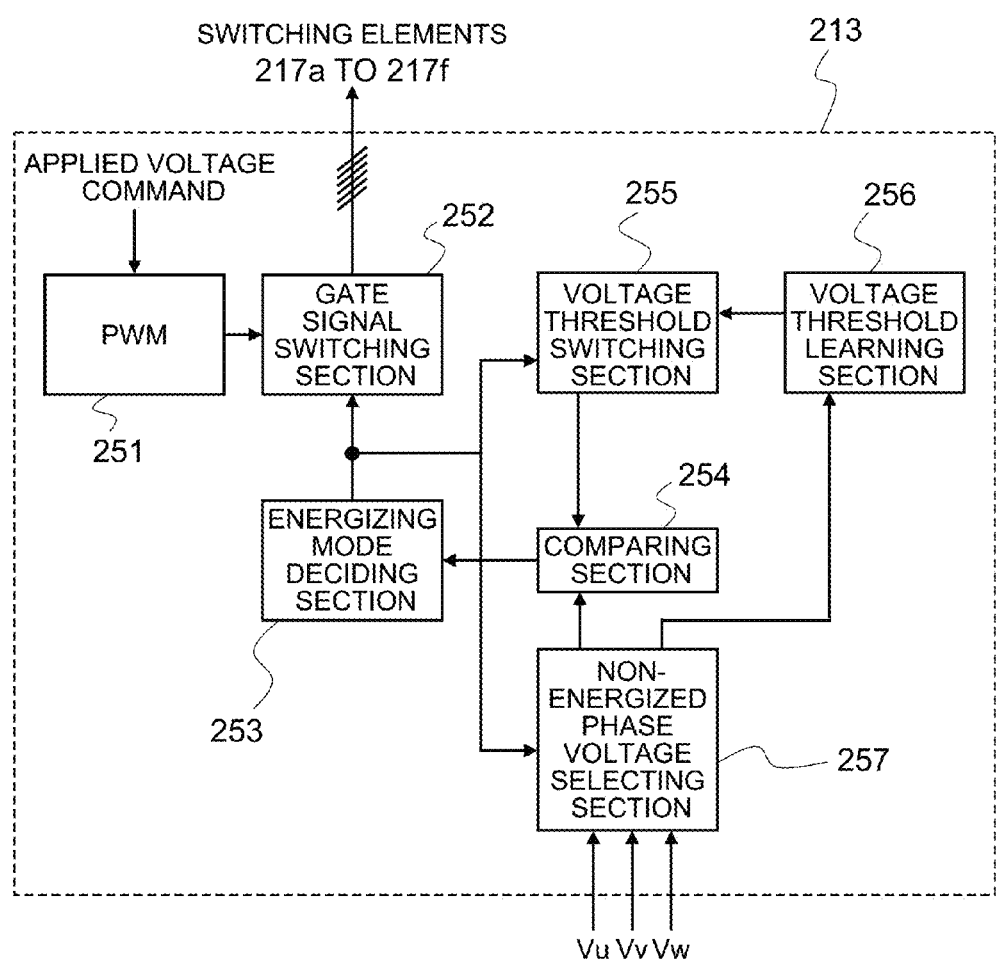
FIG. 3 is a functional block diagram of a control unit according to the first embodiment of the present invention.

FIG. 3 is a functional block diagram of control unit 213.

Control unit 213 includes a PWM generating section 251, a gate signal switching section 252, an energizing mode determining section 253, a comparing section 254, a voltage threshold switching section 255, a voltage threshold learning section 256, and a non-energized phase voltage selecting section 257.

PWM generating section 251 generates a PWM wave in which a pulse width is modulated, based on an applied voltage command (command voltage).

Energizing mode determining section 253 is a device that outputs a mode command signal that determines an energizing mode of motor driving circuit 212, and energizing mode determining section 253 switches the energizing mode among six modes by using a mode switching trigger signal outputted by comparing section 254 as a trigger.

An energizing mode represents a selection pattern of two phases to which pulse voltage is applied, the two phases being selected from three phases of the U phase, the V phase, and the W phase of brushless motor 2. There are six types of energizing modes, which are a first energizing mode M1 in which current is applied from the U phase to the V phase, a second energizing mode M2 in which current is applied from the U phase to the W phase, a third energizing mode M3 in which current is applied from the V phase to the W phase, a fourth energizing mode M4 in which current is applied from the V phase to the U phase, a fifth energizing mode M5 in which current is applied from the W phase to the U phase, and a sixth energizing mode M6 in which current is applied from the W phase to the V phase.

Then, energizing mode determining section 253 outputs a mode command signal, which commands any one of first energizing mode M1 to sixth energizing mode M6 in accordance with a mode switching trigger signal outputted by comparing section 254.

Gate signal switching section 252 determines a kind of operation that allows switching of each of switching elements 217*a*-217*f* of motor driving circuit 212 based on a mode command signal, which is an output of energizing mode determining section 253, and then outputs six gate pulse signals to motor driving circuit 212 in accordance with the determination.

Voltage threshold switching section 255 sequentially switches and outputs a voltage threshold used for detection of switching timing of an energizing mode in accordance with an energizing mode, and determines switching timing of the threshold based on a mode command signal, which is an output of energizing mode determining part 253.

In accordance with the mode command signal, non-energized phase voltage selecting section 257 selects a detection value of voltage in the non-energized phase from three-phase terminal voltage Vu, Vv, Vw of brushless motor 2, and outputs it to comparing section 254 and voltage threshold learning section 256.

Strictly speaking, the terminal voltage of a non-energized phase is a voltage between ground GND and a terminal, but, in this embodiment, voltage at a neutral point is detected, and a difference between the voltage at the neutral point and the voltage between ground GND and a terminal is obtained as the terminal voltage Vu, Vv, Vw.

The voltage at the neutral point may be half as high as voltage between ground GND and power supply voltage.

Comparing section 254 compares a threshold outputted from voltage threshold switching section 255 to a voltage detection value (a detection value of the pulse induced voltage) in the non-energized phase outputted from non-energized phase voltage selecting section 257 so as to detect switching timing of an energizing mode, in other words, whether or not a rotator position (magnetic pole position) has become a position at which an energizing mode is switched, and outputs the mode switching trigger to energizing mode determining section 253 when the switch timing is detected.

Further, voltage threshold learning section 256 is a device that updates and stores a threshold value used for determining switching timing of an energizing mode.

Since the pulse induced voltage of the non-energized phase (opened phase) fluctuates due to production tolerance of brushless motor 2, detection variation of a voltage detection circuit and so on, when a fixed value is used as a threshold, there is a possibility that switching timing of an energizing mode is determined falsely.

Then, voltage threshold learning section 256 performs threshold learning processing by which pulse induced voltage at a predetermined magnetic pole position, at which an energizing mode is switched, is detected, and a threshold stored in voltage threshold switching section 255 is corrected based on the detection result.

As described before, the energizing modes are made from six energizing modes M1~M6, and, in the rectangular wave drive, energizing modes M1~M6 are sequentially switched at switching angle positions set at 60 degrees intervals of an electric angle, and brushless motor 2 is driven by sequentially switching two phases, to which pulse voltage (pulse-like voltage) is applied, out of the three phases.

Figure 4:
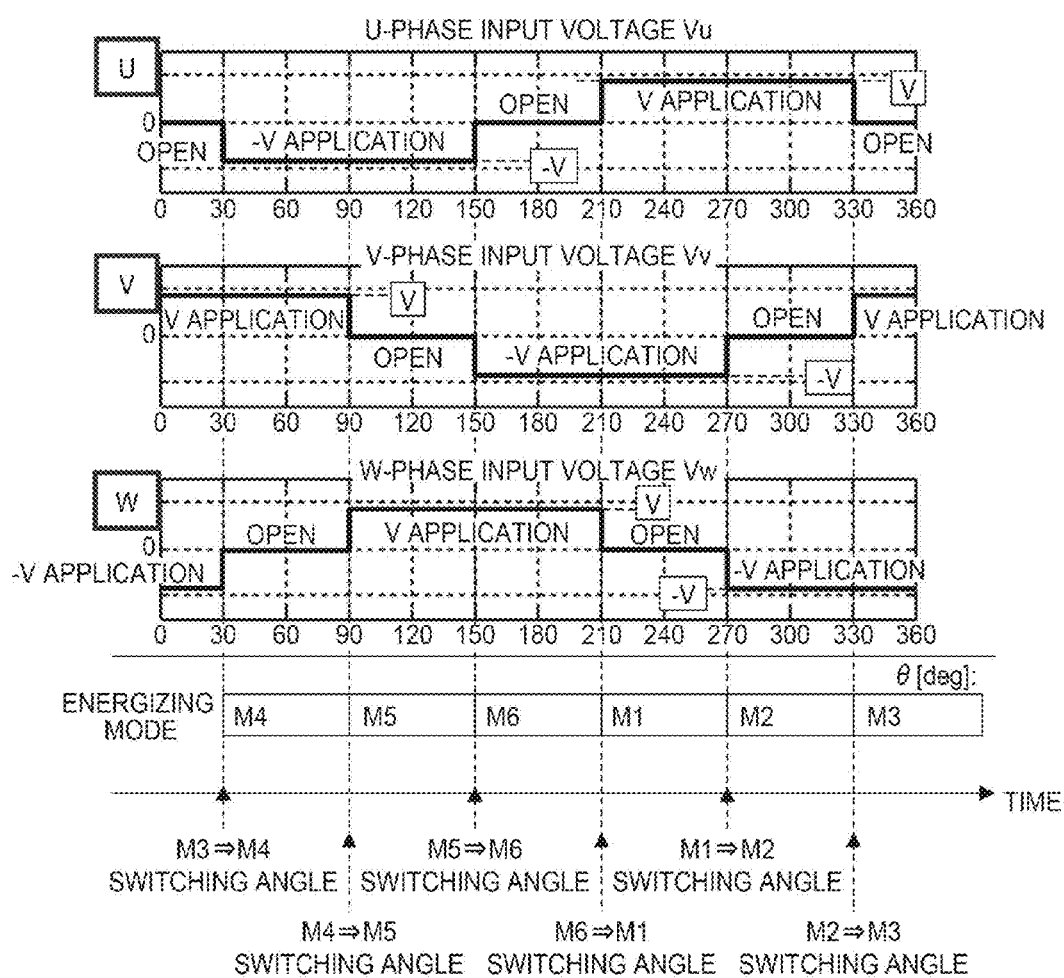
FIG. 4 is a time chart illustrating switching angle of each energizing mode, energized phases and energizing directions in each energizing mode according to the first embodiment of the present invention.

As illustrated in FIG. 4, in a case in which the angular position of the U-phase coil is set as a reference position (angle=0 degrees) of the rotator (magnetic pole), control unit 213 performs switching from third energizing mode M3 to fourth energizing mode M4 when an angular position (magnetic pole position) of the rotator is at 30 degrees, performs switching from fourth energizing mode M4 to fifth energizing mode M5 when the rotator angular position is at 90 degrees, performs switching from fifth energizing mode M5 to sixth energizing mode M6 when the rotator angular position is at 150 degrees, performs switching from sixth energizing mode M6 to first energizing mode M1 when the rotator angular position is at 210 degrees, performs switching from first energizing mode M1 to second energizing mode M2 when the rotator angular position is at 270 degrees, and performs switching from second energizing mode M2 to third energizing mode M3 when the rotator angular position is at 330 degrees.

Voltage threshold switching section 255 of control unit 213 stores updatably voltage of a non-energized phase (pulse induced voltage) at the angular position of the rotator at which the energizing mode is switched, as a threshold, and outputs a threshold in accordance to a present energizing mode.

When voltage of a non-energized phase reaches a threshold, comparing section 254 outputs a signal indicating that an angle for performing switching to the next energizing mode is detected, and energizing mode determining section 253 executes switching of an energizing mode based on the signal.

Figure 5:
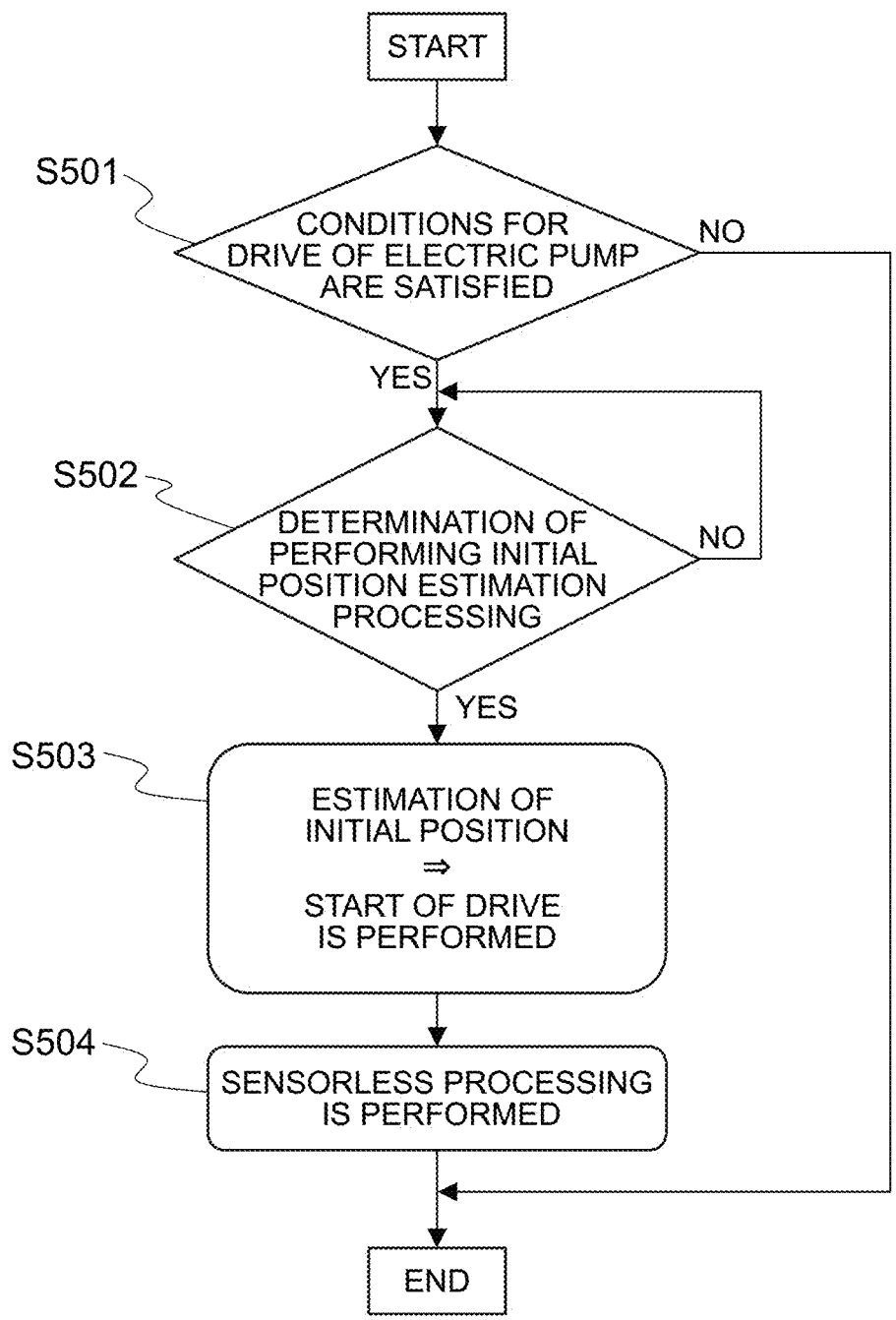
FIG. 5 is a flowchart illustrating a main routine of drive control for an electric oil pump (brushless motor) according to the first embodiment of the present invention.

The flowchart in FIG. 5 shows a main routine of control of brushless motor 2 (electric oil pump 1), which is performed by control unit 213. Control unit 213 executes the main routine illustrated in the flowchart in FIG. 5 with interruption at every predetermined time.

In step S501, control unit 213 determines whether or not conditions for driving brushless motor 2 (electric oil pump 1) are satisfied.

For example, the conditions for driving brushless motor 2 may include that power supply voltage of brushless motor 2 exceeds predetermined voltage, no abnormality is detected in brushless motor 2 and motor driving circuit 212 in various types of diagnostic processing, a power supply relay of brushless motor 2 is turned on, there is a request for driving electric oil pump 1, and so on.

In the case of the hydraulic pump system illustrated in FIG. 1, AT control unit (ATCU) 4 may determine whether the conditions for driving electric oil pump 1 are satisfied/not satisfied, and further, motor control unit 3 (control unit 213) that has obtained various types of information from AT control unit (ATCU) 4 may make the determination.

Moreover, in a case in which brushless motor 2 is a motor that drives an electric water pump used for circulating cooling water for an engine, motor control unit 3 (control unit 213) is able to determine whether a request for driving the electric water pump is satisfied, for example, when engine oil temperature exceeds set temperature or the engine is started.

When control unit 213 determines that the driving conditions are satisfied in step S501, the processing proceeds to step S502, in which control unit 213 determines whether or not a condition for carrying out estimation processing of an initial position (magnetic pole position at the time of start of drive) of brushless motor 2 is satisfied.

For example, when a drive command is generated during inertial rotation of brushless motor 2, the estimation processing makes it a condition that rotation speed of brushless motor 2 is a predetermined speed or lower, in other words, induced voltage (speed-induced voltage) generated by rotation of the rotator is predetermined voltage or smaller so that brushless motor 2 does not rotate to a degree that influences estimation of an initial position from start to end of the estimation processing.

In short, the above-mentioned predetermined speed is an upper limit value of motor rotation speed, by which an error of estimation of an initial position is contained within an allowable range, and the predetermined voltage is an induced voltage (speed-induced voltage) generated at the time of upper-limit rotating speed.

The predetermined speed may be the predetermined speed≥0 rpm, and, the estimation processing of an initial position is performed in a state in which the motor is stopped or in a state of low-speed rotation in which a change of the magnetic pole position is small enough during time required for estimation processing.

When control unit 213 determines that the condition for performing the estimation processing of an initial position is not satisfied in step S502, in short, in a case in which motor rotation speed exceeds the predetermined speed, control unit 213 repeats the processing of step S502, and the processing proceeds to step S503 when control unit 213 determines that the condition for performing the estimation processing is satisfied (when motor rotation speed≤predetermined speed is satisfied).

In a case in which control unit 213 determines that the condition for performing the estimation processing of an initial position is not satisfied in step S502, control unit 213 determines that it is not possible to estimate an initial position, and is able to perform positioning processing by which brushless motor 2 is rotated to a predetermined position and fixed.

In step S503, control unit 213 performs the processing for estimating an initial position of brushless motor 2, determines an energizing mode at the time of start of drive in accordance with the initial position estimated by the estimation processing, and starts drive of brushless motor 2 based on the determination.

Then, once brushless motor 2 starts rotating, the processing proceeds to step S504, in which control unit 213 drives brushless motor 2 with the aforementioned sensorless control, in short, with the rectangular wave drive in the region of the low rotation speed and with the sine wave drive in the region of the high speed.

Figure 6:
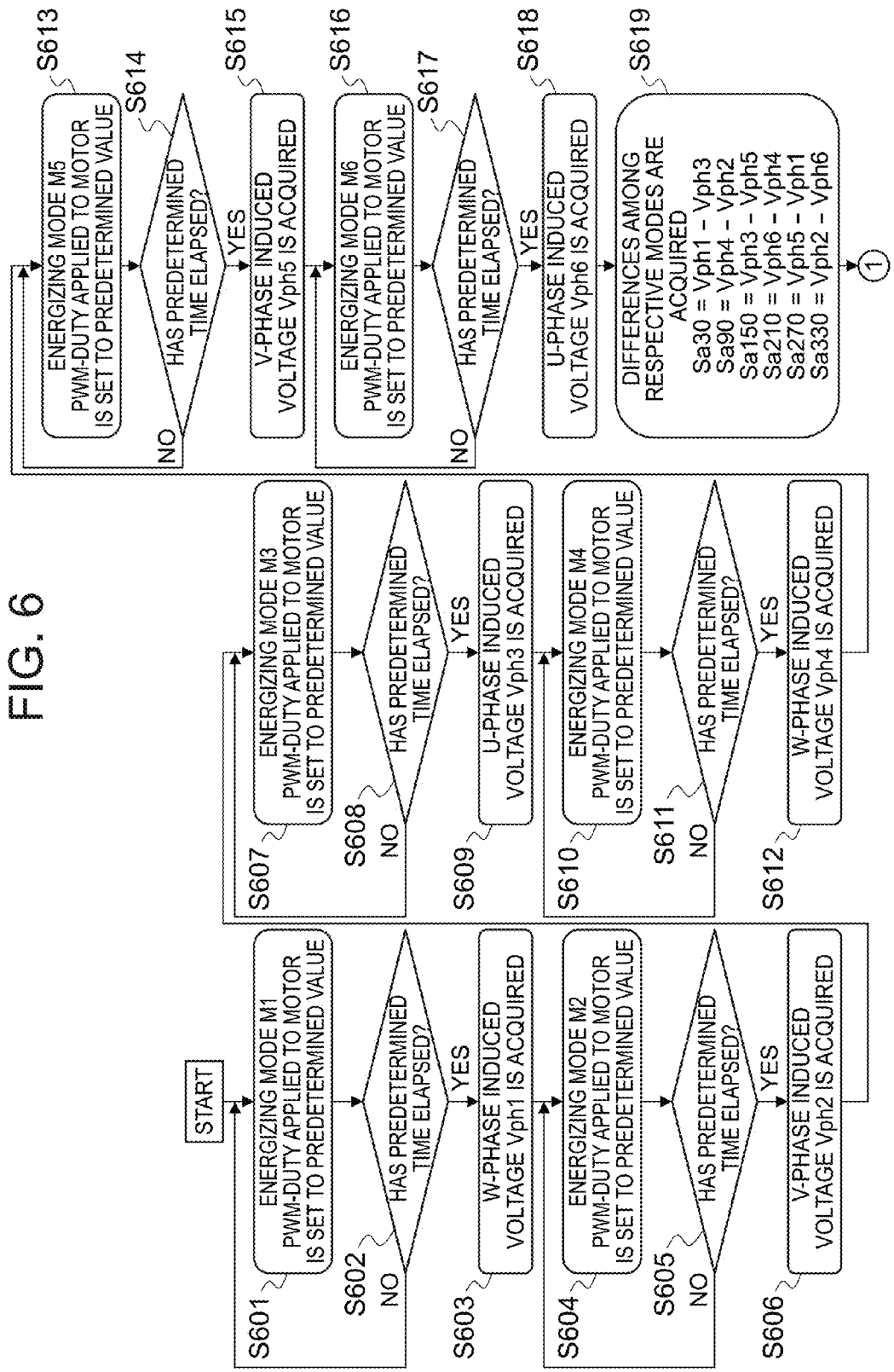
FIG. 6 is a flowchart illustrating estimation processing of an initial position according to the first embodiment of the present invention.
Figure 7:
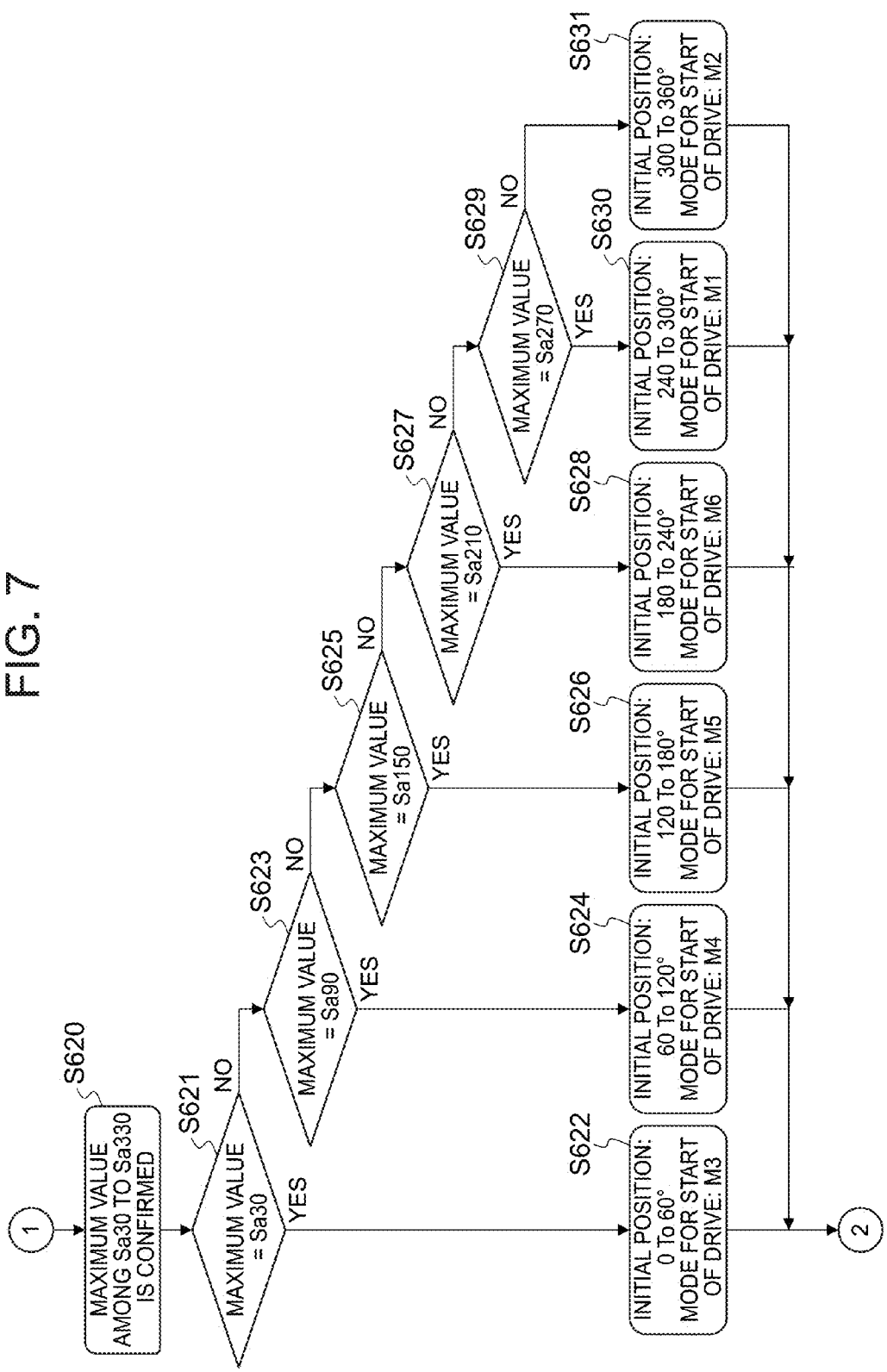
FIG. 7 is a flowchart illustrating the estimation processing of an initial position according to the first embodiment of the present invention.
Figure 8:
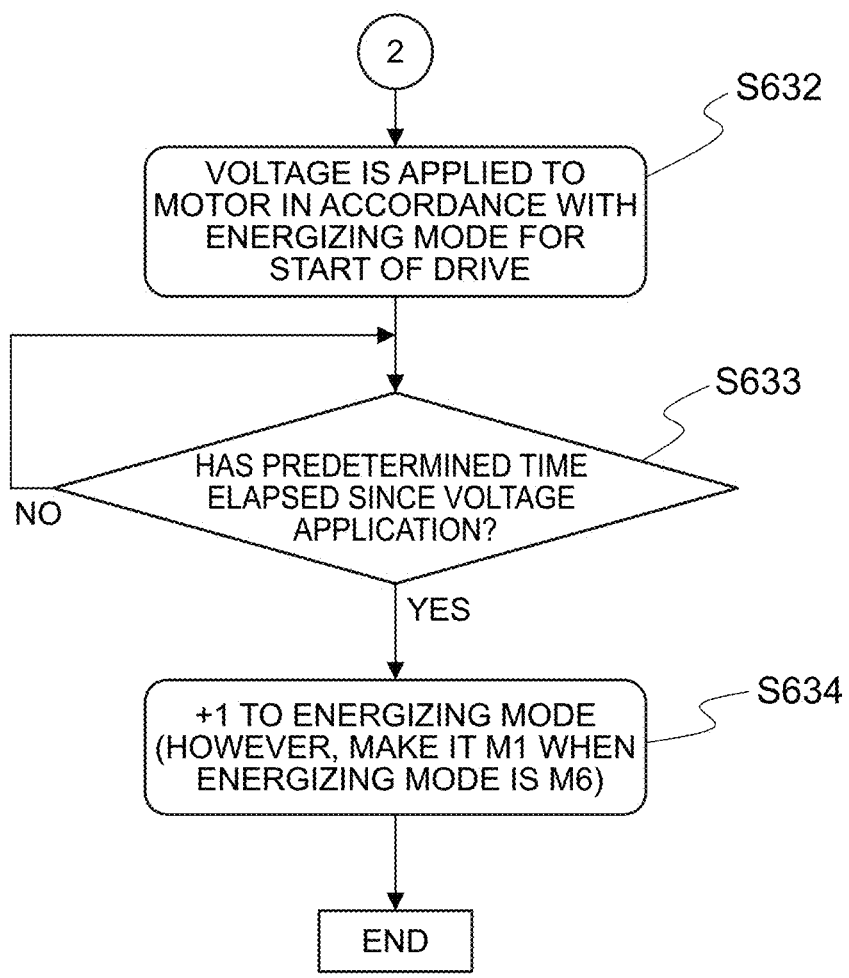
FIG. 8 is a flowchart illustrating the estimation processing of an initial position according to the first embodiment of the present invention.

The routines illustrated in the flowcharts in FIG. 6 to FIG. 8 describe details of the initial position estimation and drive starting processing in step S503 in the flowchart in FIG. 5.

The outline of the initial position estimation processing is explained. Energization is performed sequentially in each of the energizing modes so as not to allow brushless motor 2 to rotate, and voltage (pulse induced voltage) induced in a non-energized phase (opened phase) in each of the energizing modes is acquired.

Then, differences in pulse induced voltage between the energizing modes in predetermined combinations are obtained, and levels of the differences are compared with each other, thereby detecting an initial position of brushless motor 2.

First of all, in step S601, control unit 213 sets a PWM duty to a duty for initial position estimation to start energization in first energizing mode M1, and determines whether or not time from start of energization has reached a predetermined time in the next step S602.

The predetermined time is time in consideration of an influence of current that refluxes after switching of an energizing mode (hereinafter, simply referred to as a reflux), and allows voltage acquisition processing in step S603 to be performed after an influence of a reflux is sufficiently small.

Also, a duty for initial position estimation is a value in consideration of rotational torque of the motor, a pulse induced voltage difference (induced voltage difference) described later, voltage A/D conversion time, and so on, and is set as a duty that is able to ensure initial position estimation sensitivity while restraining a change of an angle of brushless motor 2 due to energization for initial position, and allows detection of pulse induced voltage of a non-energized phase.

Once control unit 213 determines that time from start of energization has reached the predetermined time in step S602, the processing proceeds to step S603, in which control unit 213 acquires data Vph1 of induced voltage (pulse induced voltage) induced in the W phase that is the non-energized phase (opened phase) in first energizing mode M1.

Control unit 213 also performs processing similar to those in abovementioned step S601~step S603 for the rest of the energizing modes, and acquires data Vph of pulse induced voltage induced in non-energized phases in the respective energizing modes. In short, control unit 213 switches an energizing mode at every predetermined time, and acquires data Vph of pulse induced voltage of a non-energized phase in each of the energizing modes.

In step S604~step S606, control unit 213 performs energization in second energizing mode M2 and acquires data Vph2 of pulse induced voltage induced in the V phase that is the non-energized phase. In step S607-step S609, control unit 213 performs energization in third energizing mode M3 and acquires data Vph3 of pulse induced voltage induced in the U phase that is the non-energized phase. In step S610~step S612, control unit 213 performs energization in fourth energizing mode M4 and acquires data Vph4 of pulse induced voltage induced in the W phase that is the non-energized phase. In step S613~step S615, control unit 213 performs energization in fifth energizing mode M5 and acquires data Vph5 of pulse induced voltage induced in the V phase that is the non-energized phase. In step S616~step S618, control unit 213 performs energization in sixth energizing mode M6 and acquires data Vph6 of pulse induced voltage induced in the U phase that is the non-energized phase.

In the energizing mode switching processing illustrated in the flowchart in FIG. 6, although switching of an energizing mode for initial position estimation is performed in the same order as the switching order in the sensorless control after the motor is started up, a switching order exclusively for the initial position estimation can be set as an energizing mode switching order. In short, in the initial position estimation, since it is required to prevent brushless motor 2 from rotating, it is possible to set that switching of an energizing mode is performed in order of unlikeliness of generation of rotational torque in accordance with the requirement.

Since current is applied from the V phase to the W phase in third energizing mode M3, and current is applied from the W phase to the V phase in sixth energizing mode M6, angles of coil exciting magnetic fluxes are in a mutually opposite relationship to each other. Similarly, angles of coil exciting magnetic fluxes are mutually opposite to each other in fourth energizing mode M4 and first energizing mode M1, and angles of coil exciting magnetic fluxes are mutually opposite to each other in fifth energizing mode M5 and second energizing mode M2.

Further, an angle of a coil exciting magnetic flux in sixth energizing mode M6 and an angle of a coil exciting magnetic flux in fourth energizing mode M4 are different by 120 degrees, and similarly, an angle of a coil exciting magnetic flux in first energizing mode M1 and an angle of a coil exciting magnetic flux in fifth energizing mode M5 are different by 120 degrees. Torque generated becomes small when energizing modes are switched between sixth energizing mode M6 and fourth energizing mode M4, and between first energizing mode M1 and fifth energizing mode M5.

Thus, in the estimation processing of an initial position, for example, switching of an energizing mode can be performed in the order of third energizing mode M3→sixth energizing mode M6→fourth energizing mode M4→first energizing mode M1→fifth energizing mode M5→second energizing mode M2.

Once control unit 213 acquires data Vph1~Vph6 of pulse induced voltage induced in the non-energized phases in each of the energizing modes as described above, the processing proceeds to step S619, in which control unit 213 calculates pulse induced voltage differences Sa30, Sa90, Sa150, Sa210, Sa270, and Sa330 between the energizing modes as stated below.

$$Sa30 = Vph1 - Vph3$$

$$Sa90 = Vph4 - Vph2$$

$$Sa150 = Vph3 - Vph5$$

$$Sa210 = Vph6 - Vph4$$

$$Sa270 = Vph5 - Vph1$$

$$Sa330 = Vph2 - Vph6$$

Figure 9A:
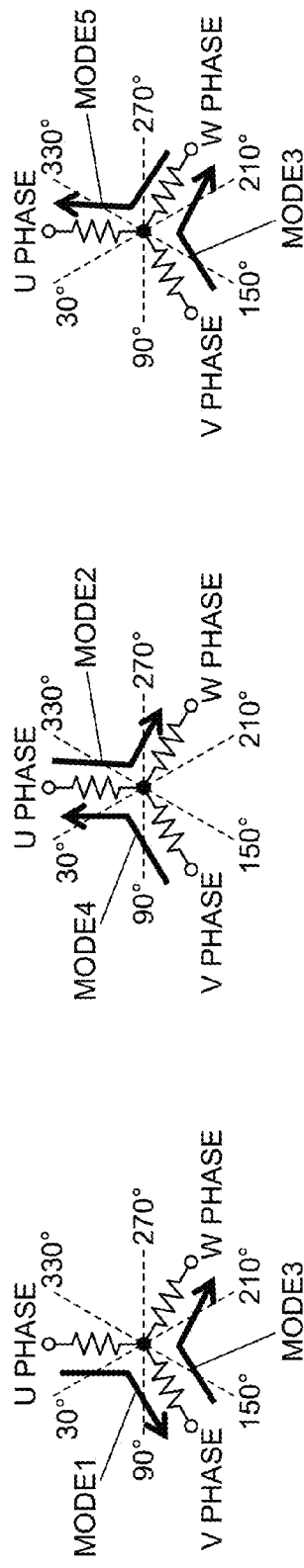
FIG. 9A to FIG. 9F are views illustrating combination patterns of energizing modes by which differences of pulse induced voltage are obtained according to the first embodiment of the present invention.

As stated above, difference Sa30 is a difference between pulse induced voltage Vph1 in first energizing mode M1 and pulse induced voltage Vph3 in third energizing mode M3, and as illustrated in FIG. 9A, current is applied from the U phase to the V phase in first energizing mode M1, and current is applied from the V phase to the W phase in third energizing mode M3.

That is, energization is performed between the V phase and the rest of U phase and W phase, out of the three phases of brushless motor 2 so that current in the V phase becomes positive and negative, and a difference between pulse induced voltage of the non-energized phase when current in the V phase becomes positive, and pulse induced voltage of the non-energized phase when current in the V phase becomes negative is obtained.

For example, when a direction towards a neutral point is regarded as a positive direction, and a direction flowing out from the neutral point is regarded as a negative direction, pulse induced voltage of the non-energized phase when current in the V phase becomes positive is voltage Vph1 induced in the W phase that is the non-energized phase in first energizing mode M1, and pulse induced voltage of the non-energized phase when current in the V phase is negative is voltage Vph3 induced in the U phase that is the non-energized phase in the third energizing mode M3.

Figure 9B:
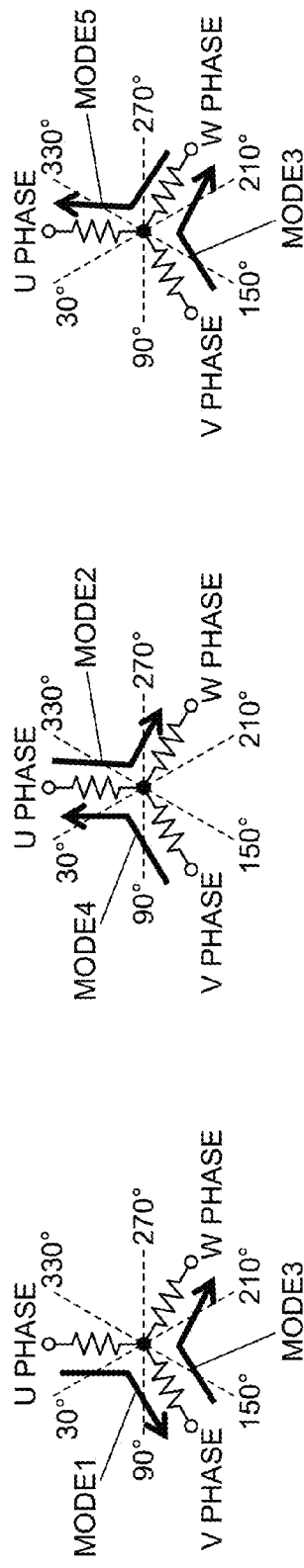
Figure 9C:
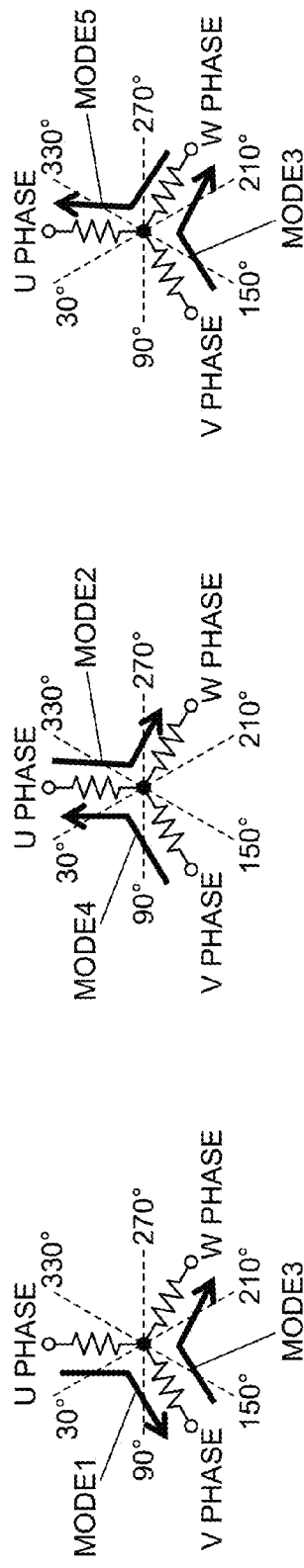

Similarly, as illustrated in FIG. 9B, in a combination of fourth energizing mode M4 and second energizing mode M2, energization is performed between the U phase and the rest of V phase and W phase so that current in the U phase becomes positive and negative, and, as illustrated in FIG. 9C, in a combination of third energizing mode M3 and fifth energizing mode M5, energization is performed between the W phase and the rest of V phase and U phase so that current in the W phase becomes positive and negative.

Figure 9D:
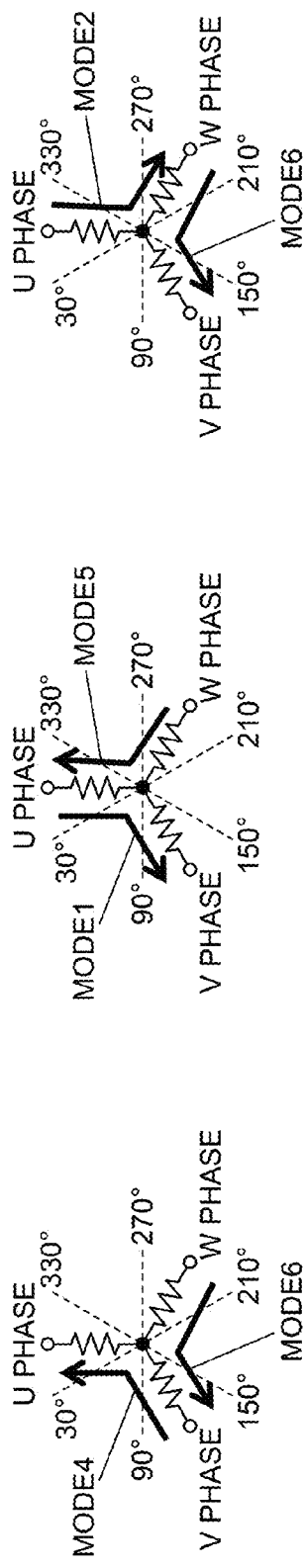
Figure 9E:
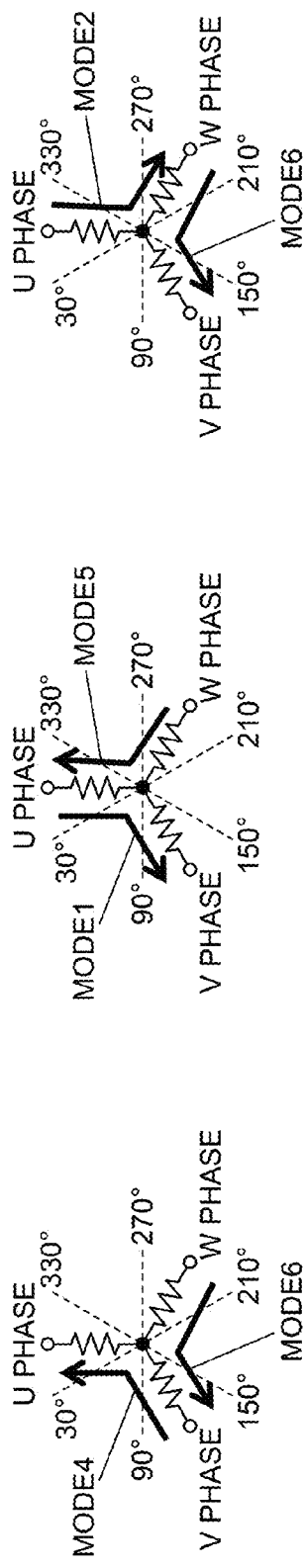
Figure 9F:
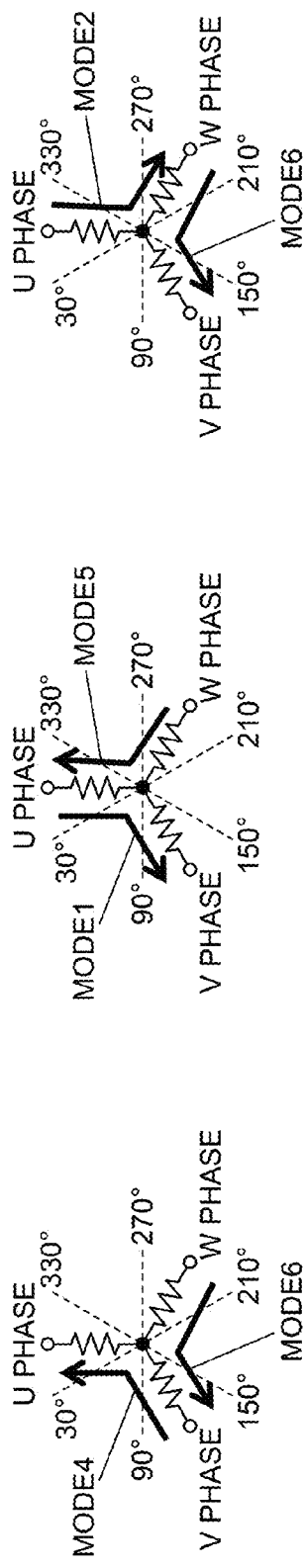

Furthermore, as illustrated in FIG. 9D, in a combination of sixth energizing mode M6 and fourth energizing mode M4, energization is performed between the V phase and the rest of U phase and W phase so that current in the V phase becomes positive and negative. As illustrated in FIG. 9E, in a combination of fifth energizing mode M5 and first energizing mode M1, energization is performed between the U phase and the rest of V phase and W phase so that current in the U phase becomes positive and negative. As illustrated in FIG. 9F, in a combination of second energizing mode M2 and sixth energizing mode M6, energization is performed between the W phase and the rest of V phase and U phase so that current in the W phase becomes positive and negative.

Then, in step S619, control unit 213 obtains pulse induced voltage differences Sa30, Sa90, Sa150, Sa210, Sa270, and Sa330 in the respective abovementioned combinations of energizing modes.

Figure 10B:
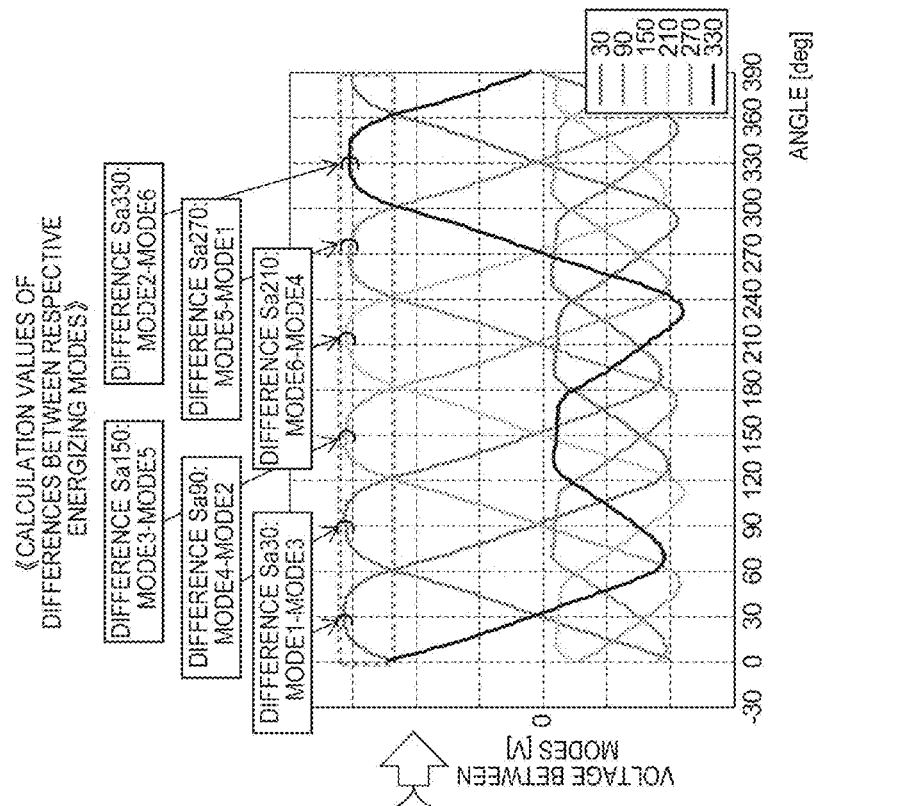
FIG. 10 is a view for explaining characteristics of detection processing of an initial position according to the first embodiment of the present invention.
Figure 10A:
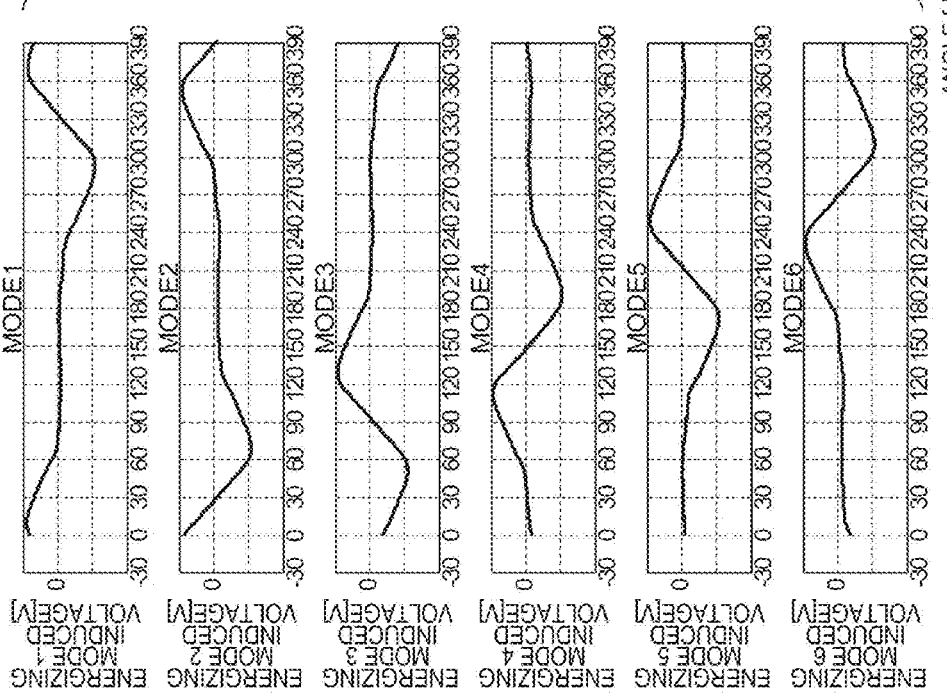

FIG. 10A is a view illustrating a change of pulse induced voltage due to an initial position (motor stop position) in each of the energizing modes.

In the example illustrated in FIG. 10A, for example, at a motor angle of 30 degrees, out of pulse induced voltage Vph in each energizing mode, pulse induced voltage Vph1 in first energizing mode M1 becomes maximum, and pulse induced voltage Vph3 in third energizing mode becomes minimum. Pulse induced voltage Vph in the rest of the energizing modes is an intermediate value between pulse induced voltage Vph1 in first energizing mode M1 and pulse induced voltage Vph3 in third energizing mode.

Therefore, as illustrated in FIG. 10B, in the case of motor angle of 30 degrees, difference Sa30, which is a result of subtraction of pulse induced voltage Vph3 in third energizing mode M3 from pulse induced voltage Vph1 in first energizing mode M1, becomes larger than differences of pulse induced voltage Vph obtained in the other combinations, and at a motor angle of 30 degrees, difference Sa30 becomes a maximum value among differences Sa30, Sa90, Sa150, Sa210, Sa270, and Sa330.

Similarly, at a motor angle of 90 degrees, difference Sa90, which is a result of subtraction of pulse induced voltage Vph2 in second energizing mode M2 from pulse induced voltage Vph4 in fourth energizing mode M4, becomes a maximum value. At a motor angle of 150 degrees, difference Sa150, which is a result of subtraction of pulse induced voltage Vph5 in fifth energizing mode M5 from pulse induced voltage Vph3 in third energizing mode M3, becomes a maximum value. At a motor angle of 210 degrees, difference Sa210, which is a result of subtraction of pulse induced voltage Vph4 in fourth energizing mode M4 from pulse induced voltage Vph6 in sixth energizing mode M6, becomes a maximum value. At a motor angle of 270 degrees, difference Sa270, which is a result of subtraction of pulse induced voltage Vph1 in first energizing mode M1 from pulse induced voltage Vph5 in fifth energizing mode M5, becomes a maximum value. At a motor angle of 330 degrees, difference Sa330, which is a result of subtraction of pulse induced voltage Vph6 in sixth energizing mode M6 from pulse induced voltage Vph2 in second energizing mode M2, becomes a maximum value.

In short, a maximum value is replaced among differences Sa30, Sa90, Sa150, Sa210, Sa270, and Sa330 at every 60 degrees of motor angle, and, for example, difference Sa30 becomes a maximum value in an angle range of approximately 60 degrees centering around the motor angle of 30 degrees (a range of motor angle of 0 degrees to 60 degrees).

Therefore, depending on which one of differences Sa30, Sa90, Sa150, Sa210, Sa270, and Sa330 is a maximum value, it is possible to detect to which of six regions at each 60 degrees an initial position of brushless motor 2 corresponds. Further, 30 degrees, 90 degrees, 150 degrees, 210 degrees, 270 degrees, and 330 degrees, which are respective central motor angles of the six regions at each 60 degrees, also coincide with positions in which the motor is attempted to be stopped by cogging torque. In this regard, it is preferred that the angle regions centering around the respective motor angles are estimated as initial positions.

For example, at the motor angle of 30 degrees, out of the pulse induced voltage Vph in each of the energizing modes, pulse induced voltage Vph1 in first energizing mode M1 becomes maximum, and pulse induced voltage Vph3 in third energizing mode becomes minimum as stated above. Therefore, in the case in which pulse induced voltage Vph1 out of pulse induced voltage Vph1~Vph6 becomes a maximum value, or, in the case in which pulse induced voltage Vph3 becomes a minimum value, it is possible to estimate that brushless motor 2 is positioned within an angle range of approximately 60 degrees centering around the motor angle of 30 degrees.

However, with such a structure, as pulse induced voltage Vph1~Vph6 become values that are mutually close to one another, an error happens in detection of the maximum induced voltage or the minimum induced voltage, thereby causing a possibility of erroneous detection of an initial position.

Thus, a combination of pulse induced voltage Vph in an energizing mode, which is expected to become a maximum value, and pulse induced voltage Vph in an energizing mode, which is expected to become a minimum value, is set in each of the angle regions, and a difference of them is obtained, thereby increasing a resolution of initial position estimation based on pulse induced voltage Vph.

After control unit 213 calculates differences Sa30, Sa90, Sa150, Sa210, Sa270, and Sa330 in step S619, the processing proceeds to step S620, in which control unit 213 obtains a maximum value among differences Sa30, Sa90, Sa150, Sa210, Sa270, and Sa330.

Then, in next step S621, control unit 213 determines whether or not difference Sa30 is detected as a maximum value. In a case in which difference Sa30 is a maximum value, the processing proceeds to step S622, in which control unit 213 determines that an initial position of brushless motor 2 is within a range of 0 degrees~60 degrees, and further, selects third energizing mode M3 as the energizing mode at the time of start of drive of brushless motor 2, based on the result of the determination of the initial position.

Meanwhile, when control unit 213 determines that difference Sa30 is not a maximum value in step S621, the processing proceeds to step S623, in which control unit 213 determines whether or not difference Sa90 is detected as the maximum value. In a case in which difference Sa90 is the maximum value, the processing proceeds to step S624, in which control unit 213 determines that an initial position of brushless motor 2 is within a range of 60 degrees~120 degrees, and further selects fourth energizing mode M4 as the energizing mode at the time of start of drive of brushless motor 2, based on the result of the determination of the initial position.

Further, when control unit 213 determines that difference Sa90 is not the maximum value in step S623, the processing proceeds to step S625, in which control unit 213 determines whether or not difference Sa150 is detected as the maximum value. In a case in which difference Sa150 is the maximum value, the processing proceeds to step S626, in which control unit 213 determines that an initial position of brushless motor 2 is within a range of 120 degrees~180 degrees, and further, selects fifth energizing mode M5 as the energizing mode at the time of start of drive of brushless motor 2, based on the result of the determination of the initial position.

Furthermore, when control unit 213 determines that difference Sa150 is not the maximum value in step S625, the processing proceeds to step S627, in which control unit 213 determines whether or not difference Sa210 is detected as the maximum value. In a case in which difference Sa210 is the maximum value, the processing proceeds to step S628, in which control unit 213 determines that an initial position of brushless motor 2 is within a range of 180 degrees~240 degrees, and further, selects sixth energizing mode M6 as the energizing mode at the time of start of drive of brushless motor 2, based on the result of the determination of the initial position.

Further, when control unit 213 determines that difference Sa210 is not the maximum value in step S627, the processing proceeds to step S629, in which control unit 213 determines whether or not difference Sa270 is detected as the maximum value. In a case in which difference Sa270 is the maximum value, the processing proceeds to step S630, in which control unit 213 determines that an initial position of brushless motor 2 is within a range of 240 degrees~300 degrees, and further, selects first energizing mode M1 as the energizing mode at the time of start of drive of brushless motor 2, based on the result of the determination of the initial position.

Meanwhile, when control unit 213 determines that difference Sa270 is not the maximum value in step S629, the processing proceeds to step S631, in which control unit 213 determines that an initial position of brushless motor 2 is within a range of 300 degrees and 360 degrees. Further, control unit 213 selects second energizing mode M2 as the energizing mode at the time of start of drive of brushless motor 2, based on the result of the determination of the initial position.

When control unit 213 detects that more than one differences among Sa30, Sa90, Sa150, Sa210, Sa270, and Sa330 indicate maximum values in step S620, control unit 213 determines that estimation of an initial position is not possible, and is able to proceed from processing of starting drive of the motor based on the initial position estimation to processing of starting drive of the motor after positioning processing for brushless motor 2 is performed.

As stated above, control unit 213 detects to which one of the six angle sections of 0 degrees~60 degrees, 60 degrees~120 degrees, 120 degrees~180 degrees, 180 degrees~240 degrees, 240 degrees~300 degrees, and 300 degrees~360 degrees an initial position of brushless motor 2 corresponds, based on a combination of the energizing modes in which the maximum value among differences Sa30, Sa90, Sa150, Sa210, Sa270, Sa330 is calculated.

Then, once the initial position (stop position) of brushless motor 2 is detected, the optimum energizing mode for starting the drive from the initial position is determined.

Here, in a case in which the positioning processing is performed, in which brushless motor 2 is rotated to a known angle and fixed, it takes time until brushless motor 2 is fixed (converges) to a predetermined position when motor inertia is large, causing a delay in starting drive of brushless motor 2. In contrast, in the initial position detection (estimation) processing, energization is performed in each of the energizing modes so as not to allow brushless motor 2 to rotate from the stop position, and initial position (stop position) is estimated based on pulse induced voltage of a non-energized phase detected by the energization. Therefore, it is possible to start drive of brushless motor 2 responsively without being influenced by motor inertia.

In the case of brushless motor 2 that drives an oil pump, when it is possible to start drive of brushless motor 2 responsively, it is possible to improve starting performance by responsively raising oil pressure to be supplied to, for example, frictional engaging elements such as a clutch that structures a power transmission system, and it is also possible to improve lubrication and cooling performances by responsively supplying oil for lubrication and cooling to the frictional engaging elements and gears.

In step S601~step S631, once control unit 213 detects an initial position and determines an energizing mode at the time of start of drive in accordance with the initial position, the processing proceeds to step S632, in which control unit 213 starts applying voltage to brushless motor 2 in accordance with the determined energizing mode at the time of start of drive.

Then, in next step S633, control unit 213 determines whether or not elapsed time from start of voltage application has reached a predetermined time.

The predetermined time in step S633 is set based on delay time from start of voltage application until start of rotation of brushless motor 2. In short, the predetermined time is set so that it is possible to estimate that brushless motor 2 has started rotating in a case in which elapsed time from start of voltage application has reached the predetermined time.

When control unit 213 detects that elapsed time from start of voltage application has reached the predetermined time, the processing proceeds to step S634, in which control unit 213 switches an energizing mode from the energizing mode at the time of start of drive to the next energizing mode according to the order of the sensorless control.

Since the energizing mode switching order in the sensorless control is set to first energizing mode M1→second energizing mode M2→third energizing mode M3→fourth energizing mode M4→fifth energizing mode M5→sixth energizing mode M6, in a case in which, for example, an initial position is between 0 degrees-60 degrees and drive starts in third energizing mode M3, control unit 213 performs switching from third energizing mode M3 to fourth energizing mode M4 when the processing proceeds to step S634.

After the energizing mode is switched in step S634, brushless motor 2 is driven by rectangular wave drive, in which switching timing of an energizing mode is detected based on a comparison of voltage of a non-energized phase to a threshold and the energizing modes are switched sequentially, and then switched to the sine wave drive as rotation speed becomes high.

In step S632~step S634, control unit 213 switches an energizing mode after elapse of the predetermined time since start of voltage application in accordance with an energizing mode corresponding to the initial position, thereby making it possible to start drive of brushless motor 2 based on an initial position detected at resolution of 60 degrees.

Figure 11:
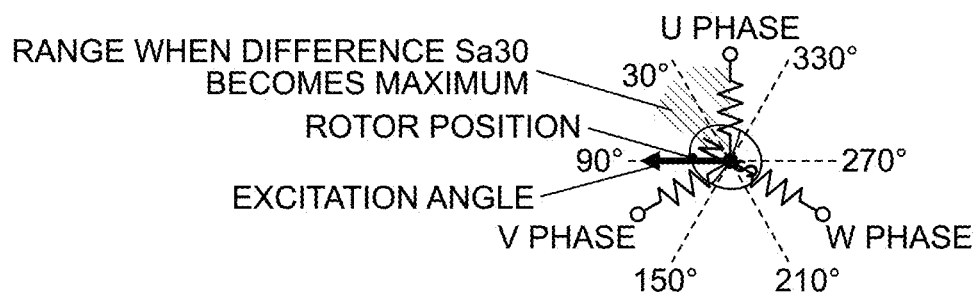
FIG. 11 is a view illustrating an example of a correlation between an initial position and an excitation angle in an energizing mode at the time of start of drive according to the first embodiment of the present invention.

For example, as illustrated in FIG. 11, it is assumed that an actual initial position is at 60 degrees when difference Sa30 is the maximum value, it is detected that initial position of brushless motor 2 is within the range of 0 degrees~60 degrees, and the energizing mode at start of drive is set to third energizing mode M3 (excitation angle of 90 degrees).

Then, in a case in which switching from an energizing mode at start of drive to the next energizing mode is performed based on a comparison of voltage of a non-energized phase (pulse induced voltage) to a threshold, although the angle at which switching from third energizing mode M3 to fourth energizing mode M4 is performed is 30 degrees, the actual motor angle is 60 degrees that exceeds the 30 degrees. Therefore, a condition for switching the energizing modes is not satisfied, and switching from third energizing mode M3 to next fourth energizing mode M4 is not performed.

Figure 12:
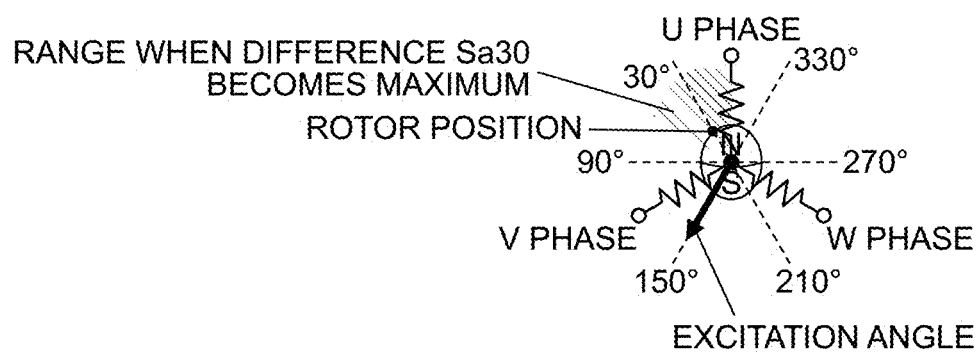
FIG. 12 is a view illustrating an example of a correlation between an initial position and an excitation angle in an energizing mode at the time of start of drive according to the first embodiment of the present invention.

Meanwhile, as illustrated in FIG. 12, when it is detected that an initial position of brushless motor 2 is within the range of 0 degrees~60 degrees, an energizing mode at the time of start of drive is set to fourth energizing mode M4 (excitation angle of 150 degrees). Thus, even when the actual initial position is 60 degrees, a switching condition based on a comparison of voltage of a non-energized phase (pulse induced voltage) to a threshold is satisfied once brushless motor 2 rotates from 60 degrees, which is the initial position, to 90 degrees because the switching angle from fourth energizing mode M4 to fifth energizing mode M5 is 90 degrees, and thus, switching from fourth energizing mode M4 to fifth energizing mode M5 is performed.

However, when the actual initial position is at 0 degrees, when drive starts in fourth energizing mode M4 in which the excitation angle is 150 degrees, rotational torque generated is small, and there is a possibility that brushless motor 2 does not rotate when a load is large.

Figure 13:
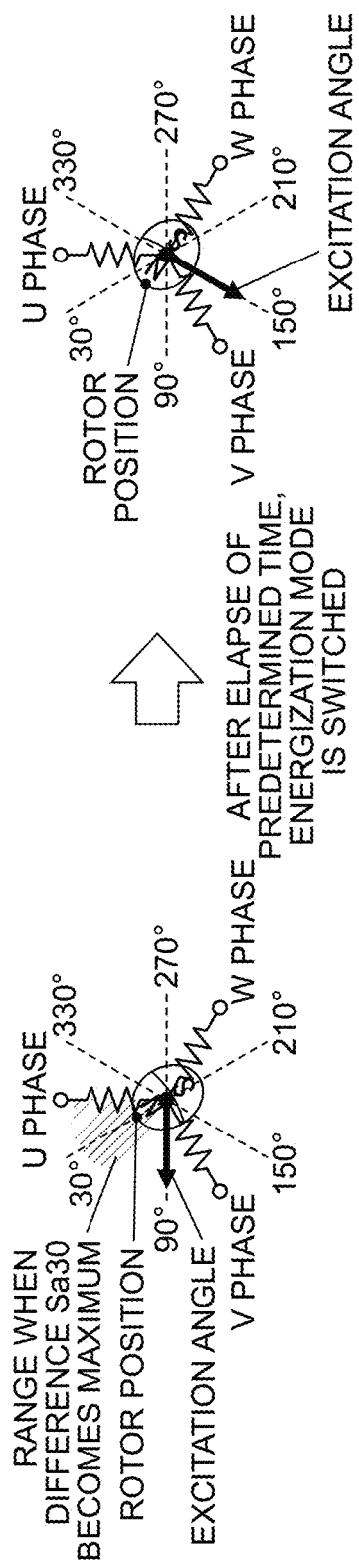
FIG. 13 is a view illustrating an example of an initial position and switching processing of an energizing mode at the time of start of drive according to the first embodiment of the present invention.

In contrast, as illustrated in FIG. 13, when it is detected that the initial position of brushless motor 2 is within the range of 0 degrees~60 degrees, an energizing mode at the time of start of drive is set to third energizing mode M3 (excitation angle of 90 degrees). Then, after voltage is applied in third energizing mode M3 for a predetermined time and brushless motor 2 starts rotating, switching to fourth energizing mode M4 is performed, thereby making it possible to start drive of brushless motor 2 regardless of an actual initial position and a load.

In short, when it is detected that the initial position of brushless motor 2 is within the range of 0 degrees~60 degrees, even when an actual initial position is at 60 degrees, switching from third energizing mode M3 to next fourth energizing mode M4 is controlled by time from start of voltage application, thereby making it possible to perform switching from third energizing mode M3 to fourth energizing mode M4.

Further, when it is detected that the initial position of brushless motor 2 is within the range of 0 degrees~60 degrees, even when an actual initial position is at 0 degree, it is possible to generate sufficient rotational torque by starting voltage application in third energizing mode M3 (excitation angle of 90 degrees).

Also, switching from fourth energizing mode M4 to fifth energizing mode M5 is performed at the angular position of 90 degrees. However, even when an actual initial position is at 60 degrees, the angular position of 90 degrees is reached after rotation starts from the initial position and switching to fourth energizing mode M4 is performed, thereby making it possible to perform switching from fourth energizing mode M4 to fifth energizing mode M5 based on a comparison of pulse induced voltage of a non-energized phase to a threshold.

Even in a case in which the initial position is outside 0 degrees~60 degrees, it is obvious that drive of brushless motor 2 can be started similarly to the above-mentioned case in which the initial position is between 0 degrees~60 degrees.

Here, switching of an energizing mode in the above-mentioned sensorless control is performed basically by detecting a change from a level of induced voltage of a non-energized phase (opened phase) corresponding to an energizing mode before switching to a level thereof corresponding to an energizing mode after switching. To be specific, the switching is performed by detecting that an output of comparing section 254, to which induced voltage of an opened phase and threshold voltage are inputted, is inverted from an L (H) level to an H (L) level (detection of an edge of an output pulse). This is to avoid switching of an energizing mode during a reflux because, in a system (detection of a level of an output pulse) in which an energizing mode is switched when it is detected that induced voltage is at a level corresponding to an energizing mode after switching, a reflux generated right after switching of an energizing mode causes induced voltage to satisfy a condition of a level corresponding to the next energizing mode after switching.

However, in a case in which induced voltage at an actual initial position when an initial position is estimated is already in a level corresponding to an energizing mode after switching, a level does not change in accordance with switching (a level of an output pulse from comparing section 254 is constant), and an energizing mode is thus not switched.

For example, after estimation of an initial position, when it is detected that an initial position of brushless motor 2 is within the range of 0 degrees~60 degrees, and, when an actual initial position exceeds 30 degrees, switching from third energizing mode M3 to fourth energizing mode M4 is not performed.

Thereupon, only for the first switching of an energizing mode after estimation of an initial position, switching based on level detection is performed, in which an energizing mode is switched by detecting that a level of induced voltage is a level corresponding to an energizing mode after switching. The second switching of an energizing mode and after is performed in an edge detection method in which a change of a level of induced voltage from a level corresponding to an energizing mode before switching to a level corresponding to an energizing mode after switching is detected.

Incidentally, in the above-mentioned estimation processing of an initial position, although voltage application is performed with a duty ratio in a range in which rotational torque of brushless motor 2 is not generated, in detection of induced voltage induced in an non-energized phase, voltage application with a minimum duty ratio (minimum pulse width) or higher is demanded in order to avoid a ringing period and also ensure A/D conversion time.

Therefore, when a set duty ratio in the estimation processing of an initial position (in short, a duty ratio that does not allow generation of rotational torque) becomes smaller than a minimum duty ratio required for detecting induced voltage, detection accuracy of induced voltage of an non-energized phase (opened phase), which is used for estimation of an initial position, decreases, or the detection becomes impossible.

Meanwhile, when a minimum duty ratio required for detecting induced voltage exceeds an upper limit of a duty ratio that does not allow generation of rotational torque, although it is possible to detect induced voltage of an non-energized phase (opened phase) used for estimation of an initial position with sufficient accuracy when brushless motor 2 is driven with the minimum duty ratio, brushless motor 2 rotates during the estimation processing of an initial position, thereby causing an estimation error of an initial position.

Thus, when a minimum duty ratio for detecting pulse induced voltage exceeds an upper limit of a duty ratio that does not allow generation of rotational torque, performed in one PWM period are processing of applying current to a phase and a direction corresponding to a present energizing mode with a pulse width equivalent to the minimum duty ratio, and processing of applying current in an opposite direction to a phase corresponding to a present energizing mode with at least a pulse width equivalent to an excess amount of minimum duty ratio over the upper limit of a duty ratio that does not allow generation of rotational torque. Thus, as an average in one PWM period, it is possible to perform voltage application with a duty ratio equivalent to or lower than an upper limit of a duty ratio that does not allow generation of rotational torque.

Accordingly, it is possible to perform detection of induced voltage of a non-energized phase, which is used for the estimation processing of an initial position, with sufficient accuracy, while preventing brushless motor 2 from rotating due to voltage application in the estimation processing of an initial position.

The time chart in FIG. 14A illustrates an example of PWM control in a case in which voltage application is performed with the minimum duty ratio in third energizing mode M3 in which current is applied from the V phase to the W phase.

In FIG. 14A, by comparing PWM timer (triangle wave carrier for generation of PWM) to timer setting value Vv for the V phase, a pulse signal for driving switching element 217c on the upper side of the V phase is generated, and, when Vv≥PWM timer, switching element 217c on the upper side of the V phase is turned on.

A complementary drive is employed, in which switching element 217d on the lower side of the V phase is driven with a PWM wave that is an opposite phase to the PWM wave of switching element 217c on the upper side of the V phase, and, when switching element 217c on the upper side of the V phase is ON, switching element 217d on the lower side of the V phase is OFF.

By comparing PWM timer (triangle wave carrier for generation of PWM) to a timer setting value Vw for the W phase, a pulse signal for driving switching element 217f on the lower side of the W phase is generated, and switching element 217f on the lower side of the W phase is turned on when Vw<PWM timer.

A complementary drive is employed, in which switching element 217e on the upper side of the W phase is driven with a PWM wave of an opposite phase to the PWM wave of switching element 217f on the lower side of the W phase, and, when switching element 217f on the lower side of the W phase is ON, switching element 217e on the upper side of the W phase is OFF.

In the above-mentioned PWM control, when switching element 217c on the upper side of the V phase is ON and switching element 217f on the lower side on the W phase is ON, current is applied from the V phase to the W phase in accordance with third energizing mode M3. Therefore, in a case in which voltage application is performed at a minimum duty ratio, timer setting values Vv, Vw are set so that time, during which switching element 217c on the upper side of the V phase is ON and switching element 217f on the lower side on the W phase are ON, becomes time corresponding to the minimum duty ratio.

Then, after an elapse of a voltage ringing period when current started being applied first from the V phase to the W phase, control unit 213 acquires voltage of the U phase, which is a non-energized phase, by performing A/D conversion.

In the example illustrated in FIG. 14A, since current is applied from the V phase to the W phase in third energizing mode M3, there is no such period in which switching element 217c on the upper side on the V phase is OFF and switching element 217f on the lower side of the W phase is OFF. However, when switching element 217c on the upper side of the V phase is turned off and switching element 217f on the lower side on the W phase is turned off, switching element 217d on the lower side of the V phase is turned on and switching element 217e on the upper side of the W phase is turned on with the complementary driving control, and current is thus applied from the W phase to the V phase in the current direction that is opposite to the current direction in third energizing mode M3.

By using the above-mentioned characteristic, in the example illustrated in FIG. 14B, processing of applying current from the V phase to the W phase with a minimum duty ratio required for detection of induced voltage of a non-energized phase, and processing of applying current from the W phase to the V phase with a duty ratio equivalent to an excess amount of the minimum duty ratio over the upper limit of a duty ratio that does not allow generation of rotational torque, are performed within one PWM period, and induced voltage of a non-energized phase is detected when performing control with the minimum duty ratio.

In the PWM control illustrated in FIG. 14B, while timer setting values Vv, Vw are set to values corresponding to drive with a minimum duty ratio at timing of a valley of the PWM timer, timer setting values Vv, Vw are changed at timing of a peak of the PWM timer so that current is applied from the W phase to the V phase with a duty ratio equivalent to an excess amount of a minimum duty ratio over the upper limit of a duty ratio in which rotational torque is not generated.

In short, an output in one PWM period is divided into two, and a duty that is necessary for detection of induced voltage of a non-energized phase (positive direction torque ratio) is outputted in the first time, and a duty for correction (negative direction torque) to obtain desired torque is outputted in the second time, so that an average of the two outputs becomes desired torque (desired ON duty ratio).

In this embodiment, the PWM control illustrated in FIG. 14B is referred to as pulse shift control.

In the foregoing pulse shift control, it is possible to realize an average duty ratio of 0% by performing the control of applying a duty ratio equal to or higher than a minimum duty ratio and the control of applying current in the opposite direction with the same duty ratio as a duty ratio equal to or higher than a minimum duty ratio in one PWM period.

However, in brushless motor 2 having different characteristics from those illustrated in FIG. 10, when an average duty ratio is reduced, for example, difference Sa30 and difference Sa210 become values mutually close to each other at the motor angle of 30 degrees, difference Sa150 and difference Sa330 become values mutually close to each other at the motor angle of 150 degrees, difference Sa90 and difference Sa270 become values mutually close to each other at the motor angle of 270 degrees as illustrated in FIG. 15A and FIG. 15B, and there is a possibility that estimation of an initial position based on the determination of a maximum value is performed erroneously.

Therefore, in a case in which the pulse shift control is performed, an average duty ratio, with which only one of differences Sa30, Sa90, Sa150, Sa210, Sa270, and Sa330 becomes larger than the rest by a predetermined amount or more in each of the six angle regions, is used as a lower limit value in performing the pulse shift control.

Outlined below is the reason why a deviation among differences Sa30, Sa90, Sa150, Sa210, Sa270, and Sa330 becomes large when the average duty ratio is raised.

Figure 16:
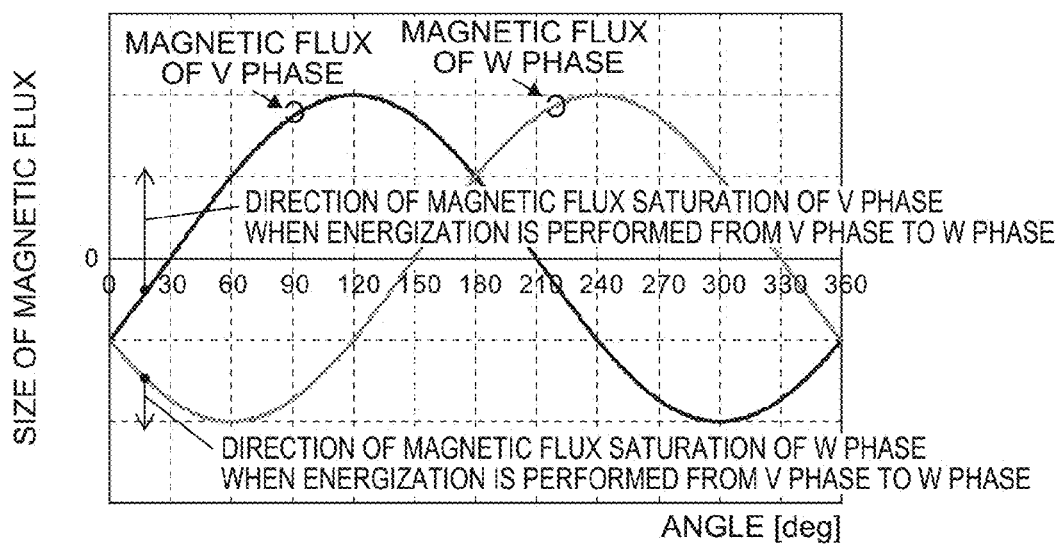
FIG. 16 is a view illustrating changes of magnetic fluxes due to rotation of a motor and directions of magnetic flux saturation due to energization according to the first embodiment of the present invention.

A case in which current is applied from the V phase to the W phase is used as an example. When a motor is rotated in a non-energized state, magnetic fluxes given to the V phase and the W phase by the N pole magnetic flux are changed in accordance with an angular position as illustrated in FIG. 16.

Figure 17:
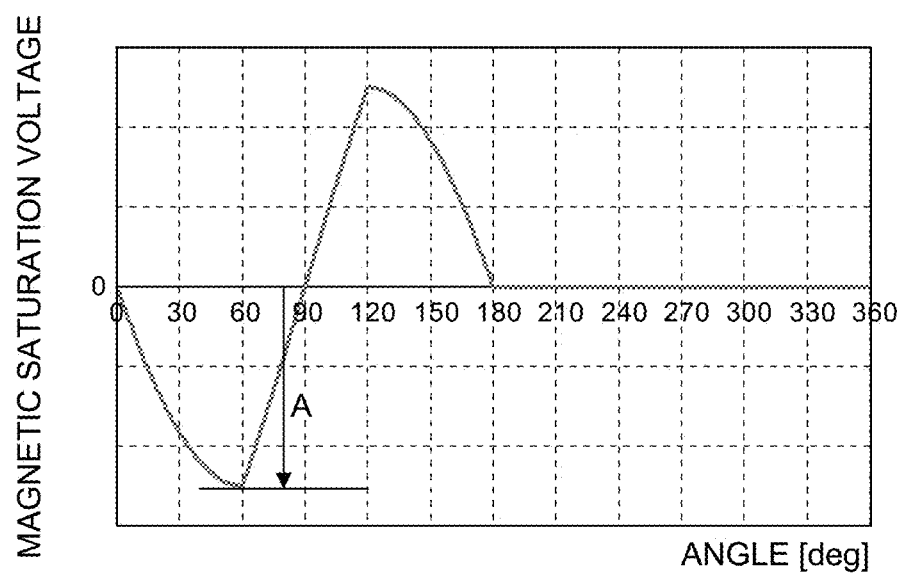
FIG. 17 is a view illustrating magnetic saturation voltage at each motor angle according to the first embodiment of the present invention.

Then, when current is applied from the V phase to the W phase, although changes of magnetic fluxes due to energization are added, since magnetic saturation happens, a difference happens between the V phase and the W phase in an amount of change of magnetic flux due to energization by an angle as illustrated in FIG. 17, and this difference appears as a magnetic flux change (magnetic saturation voltage) of a non-energized phase.

Since a peak value A of the magnetic saturation voltage is determined by an amount of current applying in a motor, when an average duty ratio is reduced and average current applying in the positive direction becomes small, the peak value becomes small, and, deviations among differences Sa30, Sa90, Sa150, Sa210, Sa270, and Sa330 become small. By raising an average duty, it is possible to obtain characteristics in which one of differences Sa30, Sa90, Sa150, Sa210, Sa270, and Sa330 shows a maximum value in each of the six angle regions as illustrated in FIG. 18.

As stated above, when an average duty ratio is low, a deviation among differences Sa30, Sa90, Sa150, Sa210, Sa270, and Sa330 becomes small, and it becomes impossible to detect an initial position based on extraction of a maximum value. Therefore, when detecting a maximum value among differences Sa30, Sa90, Sa150, Sa210, Sa270, and Sa330 in step S620 in the flowchart in FIG. 7, control unit 213 determines whether or not one of them is clearly large. In a case in which one of them is not clearly large, namely, in a case in which it is determined that estimation accuracy of an initial position is not sufficient, control unit 213 is able to perform energization (initial position estimation processing) again in each of the energizing modes by raising an average duty ratio, or to perform the positioning processing in which brushless motor 2 is rotated to a known position, as it is not possible to estimate an initial position.

It is possible to determine whether or not only one of differences Sa30, Sa90, Sa150, Sa210, Sa270, and Sa330 is clearly large, on the basis of the fact that there is not a plurality of pieces of data of difference that shows a maximum value, and that a difference between a maximum value and a second largest value is a predetermined value or larger.

Further, a range of a value of difference Sa used as a maximum value (a lower limit value of the maximum value) is set, and, in a case in which a maximum value included in the range cannot be detected (in a case in which a value detected as a maximum value is smaller than the lower limit value), it is possible to perform energization (initial position estimation processing) again in each of the energizing modes by raising an average duty ratio, or to perform the positioning processing in which brushless motor 2 is rotated to a known position, as it is not possible to estimate an initial position.

Since magnitudes of differences Sa30, Sa90, Sa150, Sa210, Sa270, and Sa330 at the same angular position change depending on temperature of brushless motor 2, it is possible to change a range of a value of difference Sa used as a maximum value (a lower limit value of a maximum value) on the basis of a detection value or an estimate value of temperature of brushless motor 2.

Figure 19:
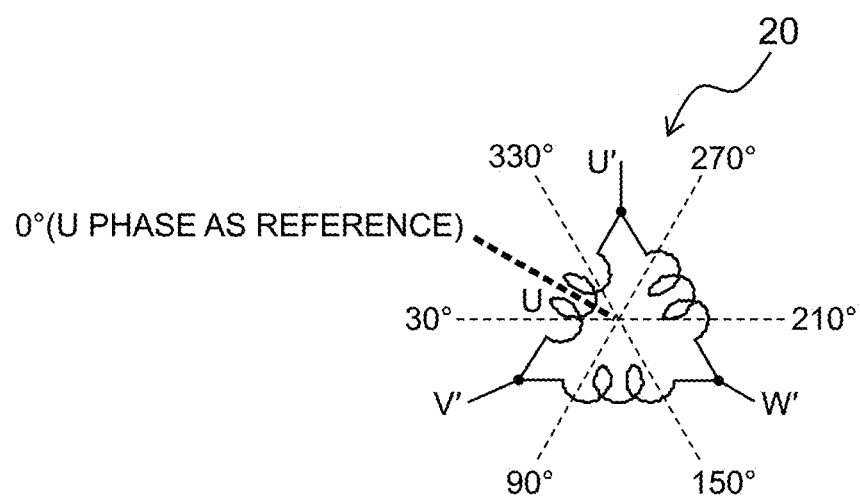
FIG. 19 is a view illustrating a structure of a brushless motor according to the second embodiment of present invention.

In the foregoing first embodiment, explanation is given in which brushless motor 2 is a three-phase DC brushless motor in which three-phase winding wires 215$u$, 215$v$, 215$w$ in the U phase, the V phase, and the W phase are star-connected with each other. However, in the second embodiment explained below, explanation is given in which a three-phase DC brushless motor 20 is used instead in which an U' phase, a V' phase, and a W phase are Δ-connected with each other as illustrated in FIG. 19.

In this brushless motor 20, since positions at which a motor is attempted to be stopped by cogging torque (herein below, referred to as a reference stop position) are at 30 degrees, 90 degrees, 150 degrees, 210 degrees, 270 degrees, and 330 degrees from the U phase that serves as a reference (0 degree) similarly to the first embodiment, differences Sa30, Sa90, Sa150, Sa210, Sa270, and Sa330 of pulse induced voltage among energizing modes are obtained.

Figure 20:
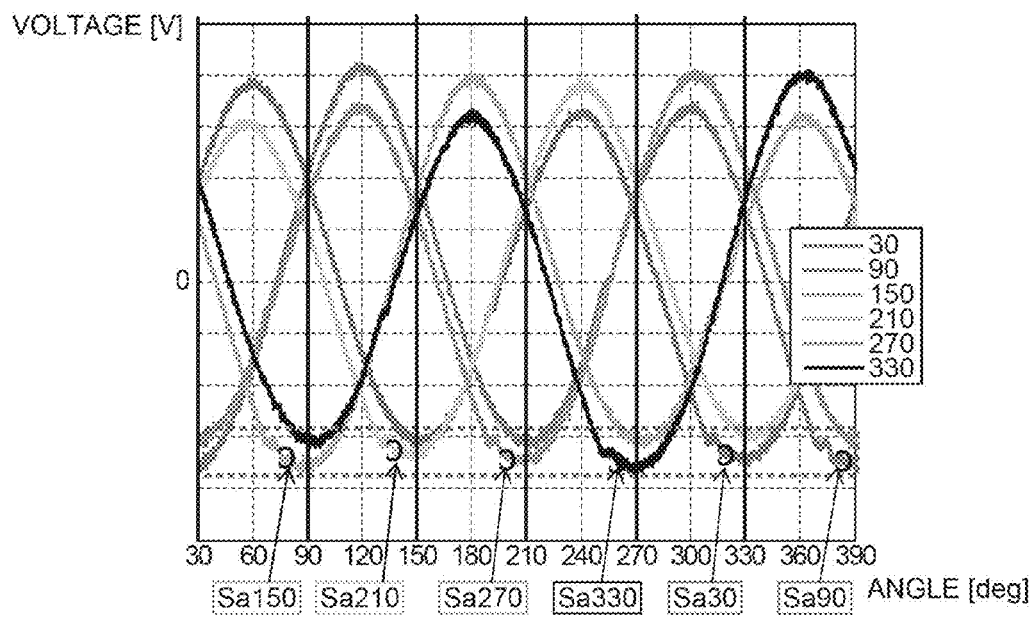
FIG. 20 is a view for explaining characteristics of detection processing of an initial position according to the second embodiment of the present invention.

However, in the second embodiment, for example, when looking at differences Sa30-Sa330 to see which one of them is a maximum value at each of the stop positions, a plurality of differences Sa are values that are mutually close to each other as illustrated in FIG. 20, and it is difficult to distinguish which one of differences Sa is a maximum value. Thus, the determination using a maximum value causes low sensitivity, and makes it difficult to estimate an initial position, thereby causing a possibility that estimation of an initial position is performed erroneously.

In short, unlike the first embodiment in which a maximum value of differences Sa30~Sa330 is highly sensitive at each initial position (reference stop position), a maximum value of differences Sa30~Sa330 at each of the reference stop positions is not clear, and a maximum value cannot be used for estimation of an initial position because determination sensitivity is too low.

On the other hand, a minimum value of differences Sa30~Sa330 at each of the reference stop positions is high in determination sensitivity and is thus obtained clearly. Hence, in the second embodiment, an initial position is estimated using a minimum value.

In short, a minimum value is replaced among differences Sa30, Sa90, Sa150, Sa210, Sa270, and Sa330 at every 60 degrees of motor angle, and, for example, difference Sa150 becomes a minimum value in an angle range of approximately 60 degrees centering around the motor angle of 90 degrees (a range of motor angle of 60 degrees to 120 degrees).

As stated above, in this second embodiment, it is detected to which one of six regions at every 60 degrees an initial position of brushless motor 20 corresponds, depending on which one of differences Sa30, Sa90, Sa150, Sa210, Sa270, and Sa330 is a minimum value.

Figure 21:
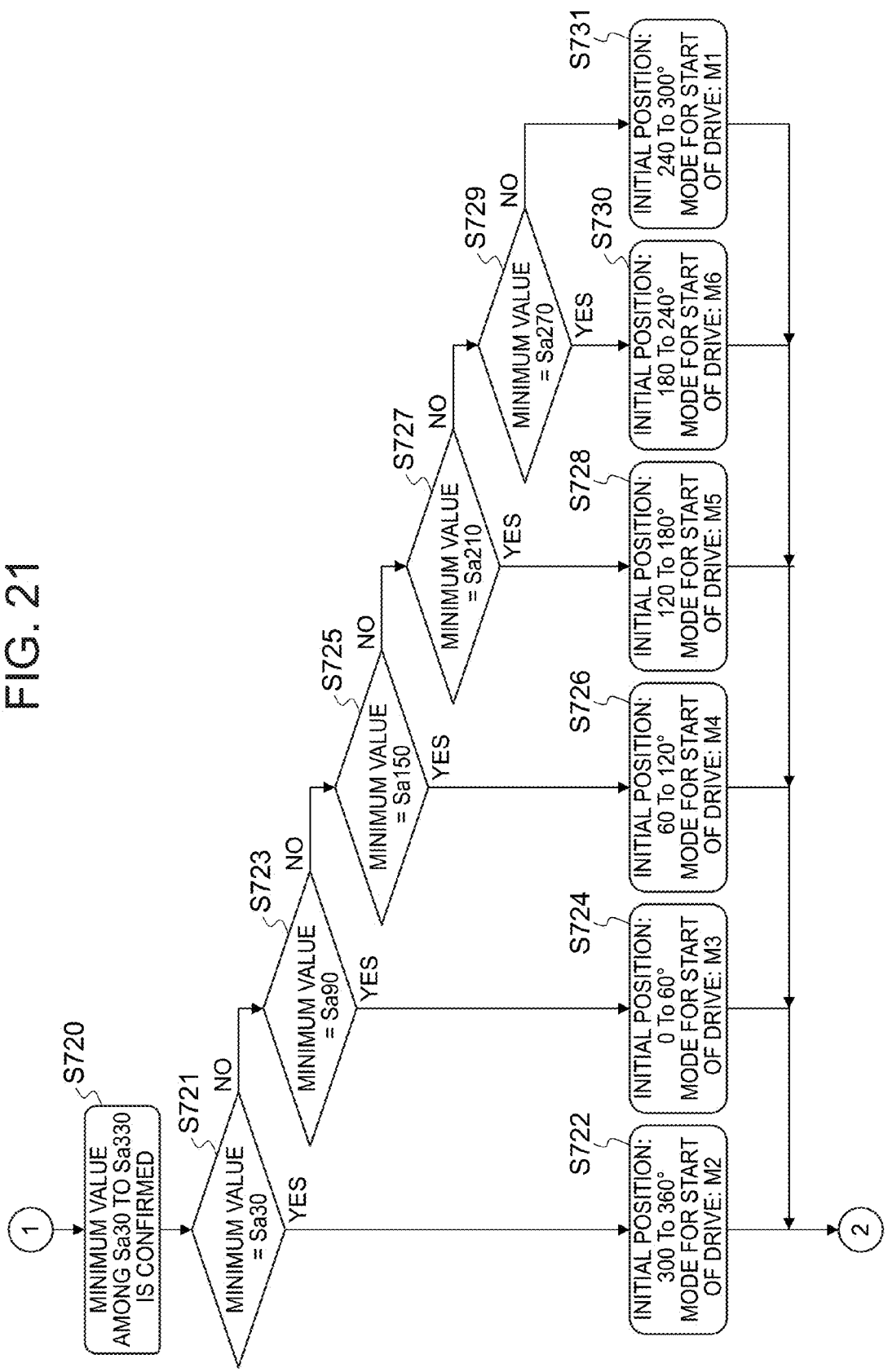
FIG. 21 is a flowchart illustrating estimation processing of an initial position according to the second embodiment of the present invention.

After control unit 213 calculates differences Sa30, Sa90, Sa150, Sa210, Sa270, and Sa330 in step S619 in the flowchart in FIG. 6, the processing proceeds to step S720 illustrated in the flowchart in FIG. 21, and control unit 213 obtains a minimum value among differences Sa30, Sa90, Sa150, Sa210, Sa270, and Sa330.

Figure 22:
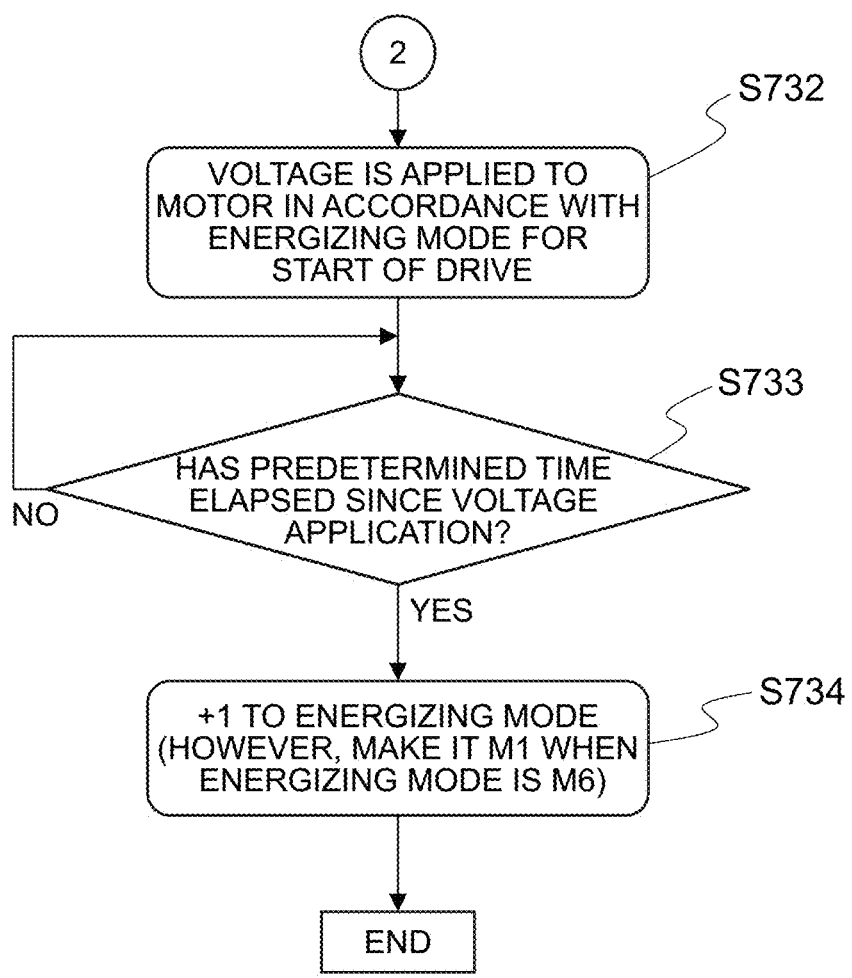
FIG. 22 is a flowchart illustrating the estimation processing of an initial position according to the second embodiment of the present invention.

Processing by control unit 213 thereafter (step S721~step S734 in the flowcharts in FIG. 21 and FIG. 22) are similar to step S621~step S634 in the foregoing first embodiment except that an initial position is detected by determination based on a minimum value, and explanation thereof is omitted here.

As stated above, in the second embodiment applied to brushless motor 20, in a case in which a maximum value among differences Sa30, Sa90, Sa150, Sa210, Sa270, and Sa330 is not clear with respect to an initial position of brushless motor 20 (motor stop position) and a maximum value for the estimation of initial position is low in sensitivity, it is possible to detect an initial position of brushless motor 20 (motor stop position) depending on which one of differences Sa30, Sa90, Sa150, Sa210, Sa270, and Sa330 is a minimum value.

In the first and second embodiments described so far, structures are such that drive of a brushless motor is started on the basis of detection to which one of six regions at every 60 degrees an initial position of brushless motor 20 corresponds, that is, an initial position detected at a resolution of 60 degrees.

However, in step S632~S634 and step S732~S734 in both embodiments, in a case in which, for example, it is detected that an initial position is within the range of 0 degrees~60 degrees, voltage application is started in third energizing mode M3 to start rotation in the third energizing mode, and, thereafter, a predetermined time is passed and transferring to the sensorless control is performed in order to perform switching from third energizing mode M3 to fourth energizing mode M4.

As stated earlier, this is to avoid such states in which sufficient rotational torque is not generated and a condition for switching of an energizing mode is not satisfied in a case in which an actual motor angle is at 0 degrees or 60 degrees even when it is detected that an initial position is within a range of 0 degrees~60 degrees at a resolution of 60 degrees.

Thus, in the third embodiment, in order to further improve detection accuracy of an initial position of brushless motor 20, out of six differences (induced voltage differences) Sa30, Sa90, Sa150, Sa210, Sa270, and Sa330 calculated in step S719, a difference between a maximum value and a minimum value of each difference Sa (difference between induced voltage differences) in each of twelve motor angle ranges, in which a region is divided at every 30 degrees, is calculated as stated below.

Figure 23:
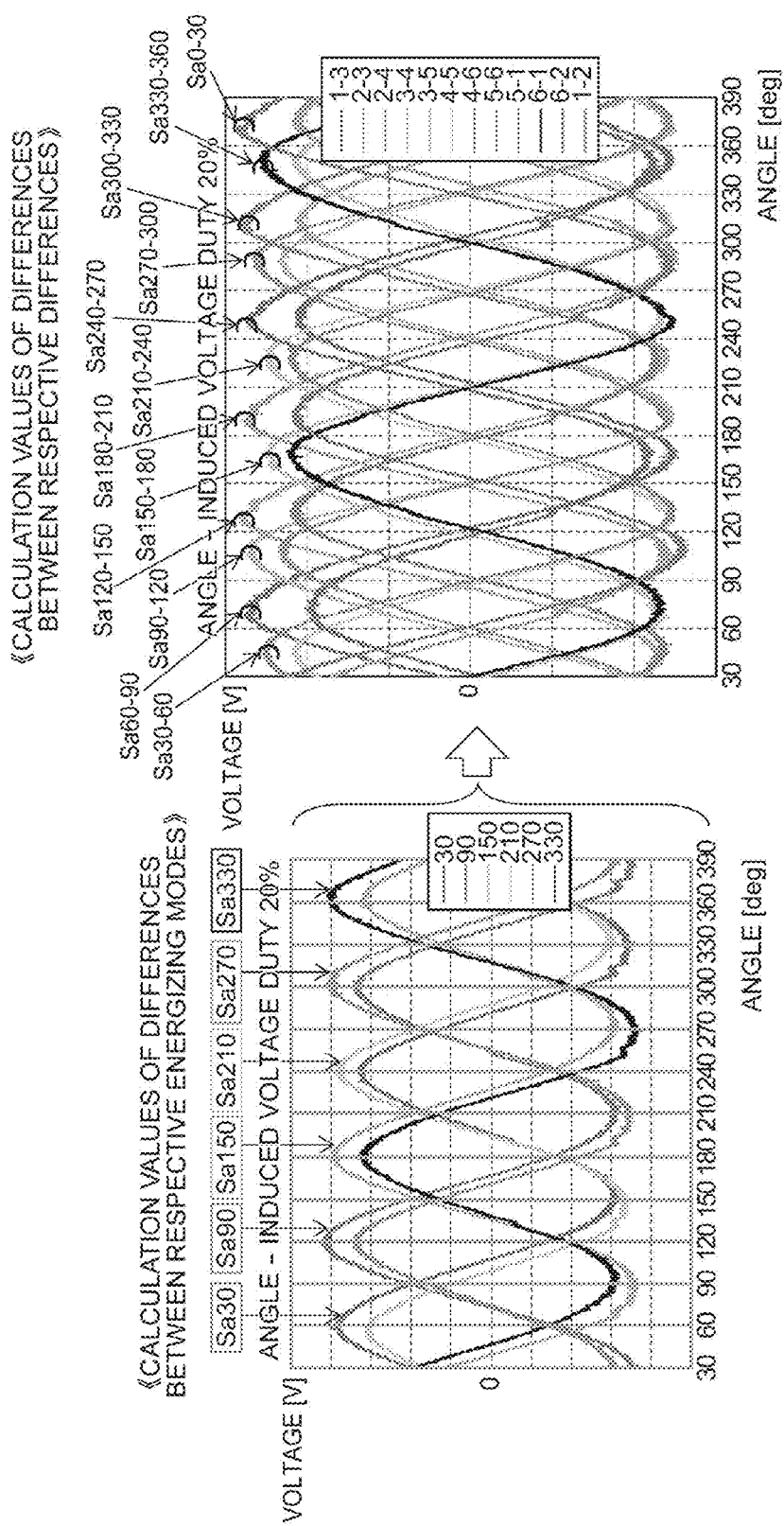
FIG. 23A and FIG. 23B are views for explaining characteristics of detection processing of an initial position according to the third embodiment of the present invention.

$Sa30\text{-}60 = Sa30 \sim Sa90$ $Sa60\text{-}90 = Sa30 \sim Sa150$ $Sa90\text{-}120 = Sa90 \sim Sa150$ $Sa120\text{-}150 = Sa90 \sim Sa210$ $Sa150\text{-}180 = Sa150 \sim Sa210$ $Sa180\text{-}210 = Sa150 \sim Sa270$ $Sa210\text{-}240 = Sa210 \sim Sa270$ $Sa240\text{-}270 = Sa210 \sim Sa330$ $Sa270\text{-}300 = Sa270 \sim Sa330$ $Sa300\text{-}330 = Sa270 \sim Sa30$ $Sa330\text{-}360 = Sa330 \sim Sa30$ $Sa0\text{-}30 = Sa330 \sim Sa90$ Sa30-60 is a difference between difference Sa30, which indicates a maximum value, and difference Sa90, which indicates a minimum value, out of differences Sa30, Sa90, Sa150, Sa210, Sa270, and Sa330, within a range of a motor angle of 30 degrees~60 degrees in FIG. 23A. Similarly, Sa60-90 is a difference between difference Sa30, which indicates a maximum value, and difference Sa150, which indicates a minimum value within a range of a motor angle of 60 degrees~90 degrees, Sa90-120 is a difference between difference Sa90, which indicates a maximum value, and difference Sa150, which indicates a minimum value within a range of a motor angle of 90 degrees~120 degrees, Sa120-150 is a difference between difference Sa90, which indicates a maximum value, and difference Sa210, which indicates a minimum value within a range of a motor angle of 120 degrees~150 degrees, Sa150-180 is a difference between difference Sa150, which indicates a maximum value, and difference Sa210, which indicates a minimum value within a range of a motor angle of 150 degrees~180 degrees, Sa180-210 is a difference between difference Sa150, which indicates a maximum value, and difference Sa270, which indicates a minimum value within a range of a motor angle of 180 degrees~210 degrees, Sa210-240 is a difference between difference Sa210, which indicates a maximum value, and difference Sa270, which indicates a minimum value within a range of a motor angle of 210 degrees~240 degrees, Sa240-270 is a difference between difference Sa210, which indicates a maximum value, and difference Sa330, which indicates a minimum value within a range of a motor angle of 240 degrees-270 degrees, Sa270-300 is a difference between difference Sa270, which indicates a maximum value, and difference Sa330, which indicates a minimum value within a range of a motor angle of 270 degrees~300 degrees, Sa300-330 is a difference between difference Sa270, which indicates a maximum value, and difference Sa30, which indicates a minimum value within a range of a motor angle of 300 degrees~330 degrees, Sa330-360 is a difference between difference Sa330, which indicates a maximum value, and difference Sa30, which indicates a minimum value within a range of a motor angle of 330 degrees~360 degrees, and Sa0-30 is a difference between difference Sa330, which indicates a maximum value, and difference Sa90, which indicates a minimum value within a range of a motor angle of 0 degrees~30 degrees.

In short, differences Sa30-60, Sa60-90, Sa90-120, Sa120-150, Sa150-180, Sa180-210, Sa210-240, Sa240-270, Sa270-300, Sa300-330, Sa330-360, and Sa0-30 are obtained by calculating voltage differences between maximum values and minimum values of differences Sa30, Sa90, Sa150, Sa210, Sa270, and Sa330 in the twelve ranges at every 30 degrees of a motor angle illustrated in FIG. 23A.

Then, as illustrated in FIG. 23B, differences Sa30-60, Sa60-90, Sa90-120, Sa120-150, Sa150-180, Sa180-210, Sa210-240, Sa240-270, Sa270-300, Sa300-330, Sa330-360, and Sa0-30 have maximum values in ranges of motor angles of 30 degrees~60 degrees, 60 degrees~90 degrees, 90 degrees~120 degrees, 120 degrees~150 degrees, 150 degrees~180 degrees, 180 degrees~210 degrees, 210 degrees~240 degrees, 240 degrees~270 degrees, 270 degrees~300 degrees, 300 degrees~330 degrees, 330 degrees~360 degrees, and 0 degrees~30 degrees (360 degrees~390 degrees).

Figure 24:
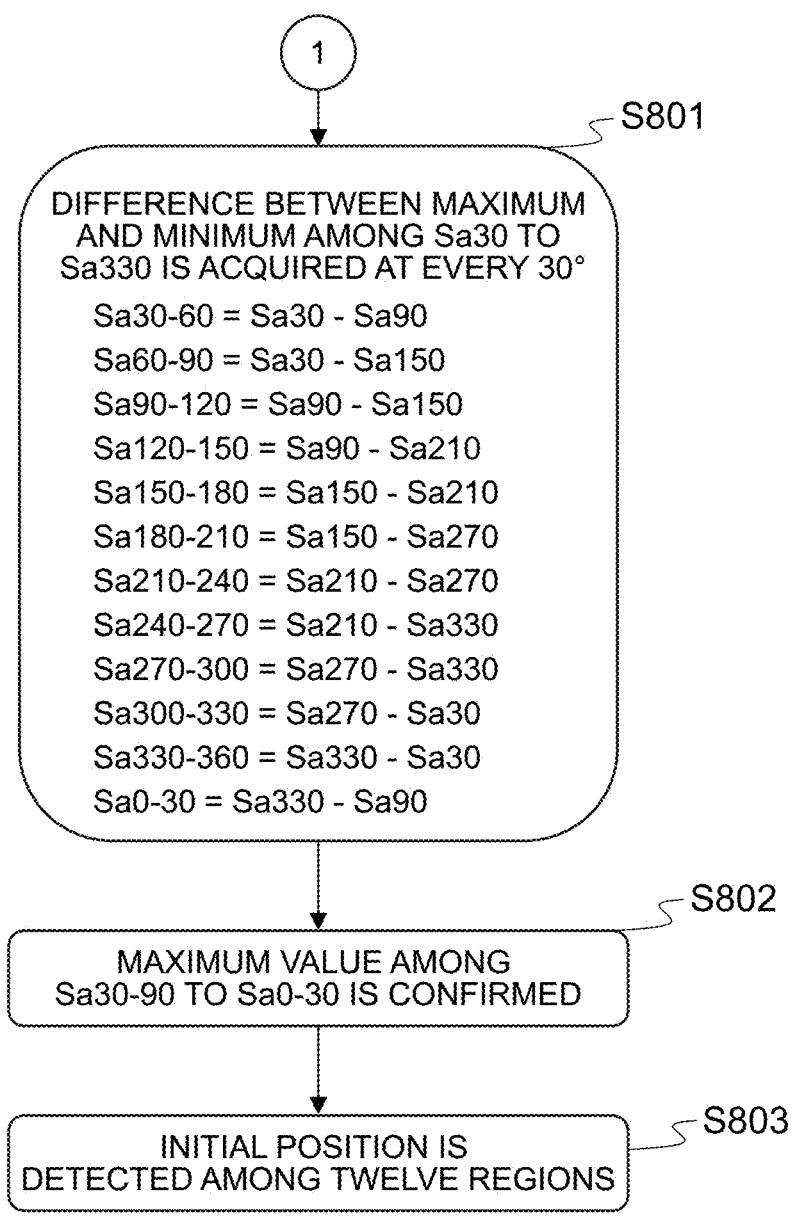
FIG. 24 is a flowchart illustrating the estimation processing of an initial position according to the third embodiment of the present invention.

In step S801 in the flowchart in FIG. 24, control unit 213 further obtains abovementioned differences Sa30-60, Sa60-90, Sa90-120, Sa120-150, Sa150-180, Sa180-210, Sa210-240, Sa240-270, Sa270-300, Sa300-330, Sa330-360, and Sa0-30 from pulse induced voltage differences Sa30, Sa90, Sa150, Sa210, Sa270 and Sa330, respectively.

Next, similarly to steps S620~631 in FIG. 7, a maximum value of differences Sa30-60, Sa60-90, Sa90-120, Sa120-150, Sa150-180, Sa180-210, Sa210-240, Sa240-270, Sa270-300, Sa300-330, Sa330-360, and Sa0-30 is confirmed in step S802, and, an initial position is detected based on which one of above-mentioned twelve differences is detected as a maximum value in step S803.

Therefore, in the third embodiment, since it is possible to detect an initial position by improving sensitivity of voltage differences for detection of initial position at every 30 degrees of a motor angle, detection accuracy of an initial position of brushless motor 20 is improved. For example, when Sa0-30=Sa330–Sa90 is detected as a maximum value, it is detected that an initial position is within a range of 0~30 degrees, and the motor is started up in third energizing mode M3. When Sa30-60=Sa30–Sa90 is detected as a maximum value, it is detected that an initial position is within a range of 30~60 degrees, and it is possible to start up the motor in fourth energizing mode M4.

In short, after detecting an initial position at a resolution of 30 degrees, it is possible to start up the brushless motor immediately in an energizing mode based on the initial position and perform a transferring to the sensorless control, thereby improving responsiveness.

In the foregoing, an initial position is detected at a resolution of 30 degrees based on differences Sa30-60, Sa60-90, Sa90-120, Sa120-150, Sa150-180, Sa180-210, Sa210-240, Sa240-270, Sa270-300, Sa300-330, Sa330-360 and Sa0-30, which are obtained by further combining differences Sa30, Sa90, Sa150, Sa210, Sa270, and Sa330 in each energizing mode in brushless motor 20 applied to the second embodiment. However, in brushless motor 2 applied to the first embodiment, it is also possible to detect an initial position at a resolution of 30 degrees, thereby improving responsiveness.

Figure 25:
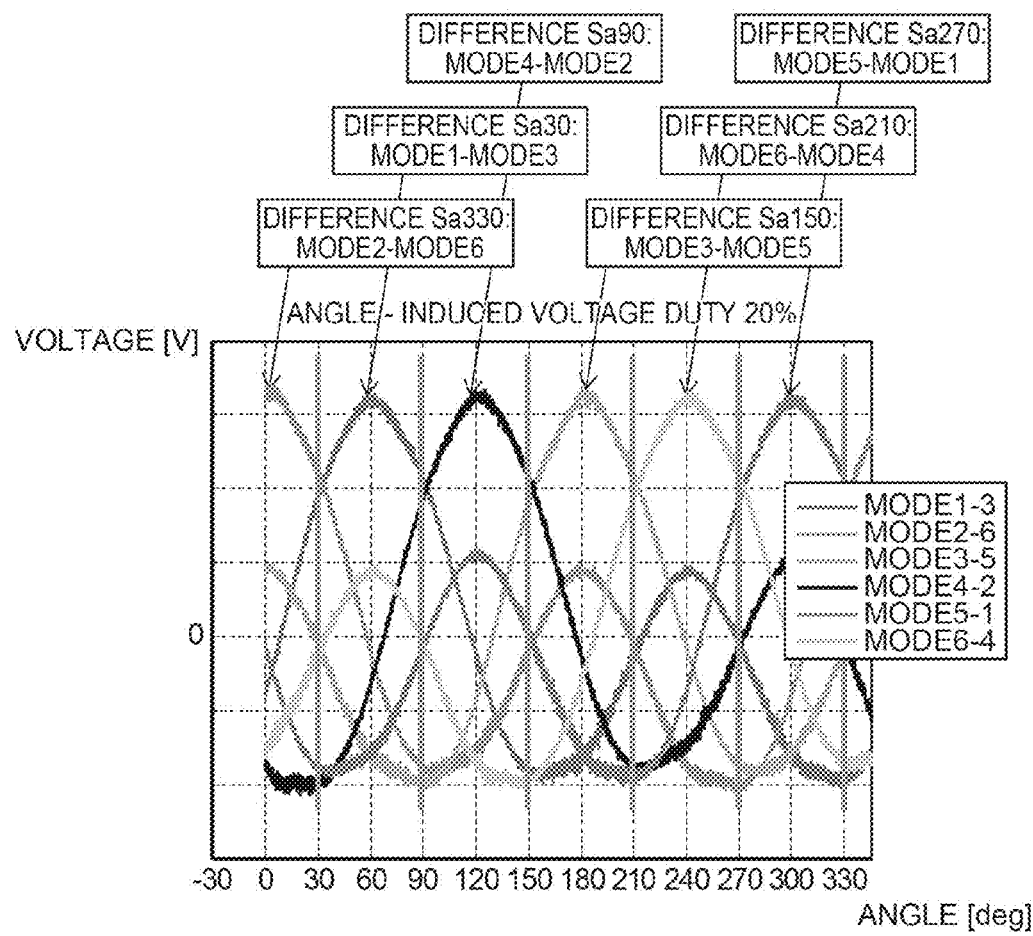
FIG. 25 is a view for explaining characteristics of induced voltage differences according to the fourth embodiment of the present invention.

On the other hand, in brushless motor 20 (Δ connection) having an especially large degree of magnetic saturation, two differences Sa are close to each other near a minimum value at each reference stop position as illustrated in FIG. 25, and it is difficult to determine which one of differences Sa is a minimum value. As stated above, determine by a minimum value is low in sensitivity, and it becomes difficult to estimate an initial position.

Figure 26A:
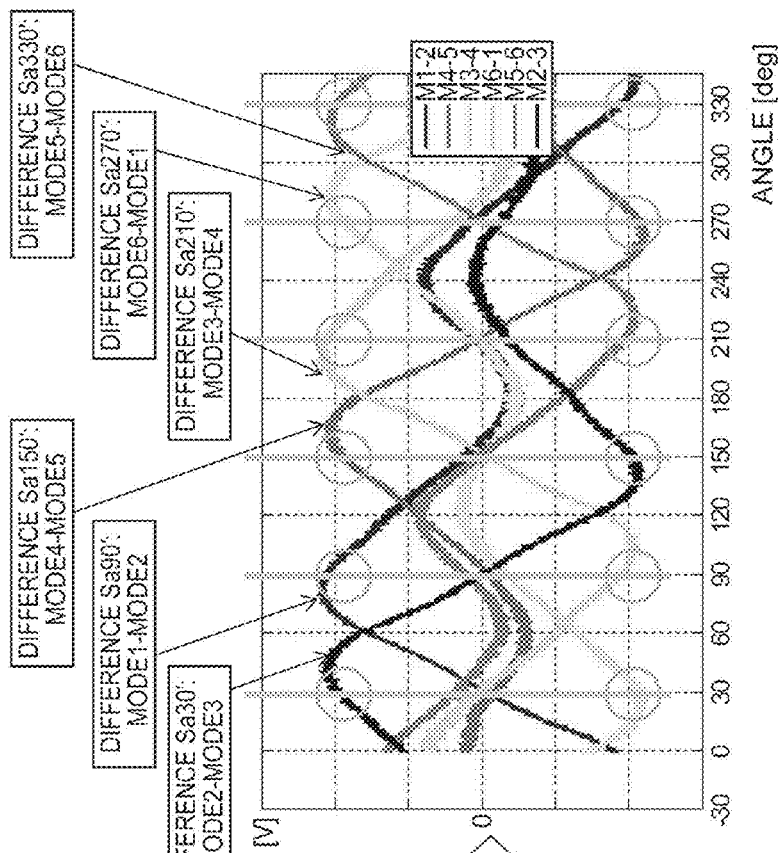
FIG. 26A and FIG. 26B are views for explaining characteristics of detection processing of an initial position according to the fourth embodiment of the present invention.

FIG. 26A is a view illustrating changes of pulse induced voltage in respective energizing modes by initial positions (motor stop positions).

In the example illustrated in FIG. 26A, for example, in sixth energizing mode M6, there is a difference between maximum values of pulse induced voltage at a motor angle of 90 degrees and a motor angle of 240 degrees. Similarly, there is a difference between peaks in other energizing modes, which is, however, caused by a large degree of magnetic saturation generated by raising an average duty.

Thus, in fourth embodiment, induced voltage difference (difference Sa) in each energizing mode is calculated as stated below by combining neighboring energizing modes, and an initial position is detected based on a difference Sa.

$$Sa30'=Vph2-Vph3$$

$$Sa90'=Vph1-Vph2$$

$$Sa150'=Vph4-Vph5$$

$$Sa210'=Vph3-Vph4$$

$$Sa270'=Vph6-Vph1$$

$$Sa330'=Vph5-Vph6$$

Figure 26B:
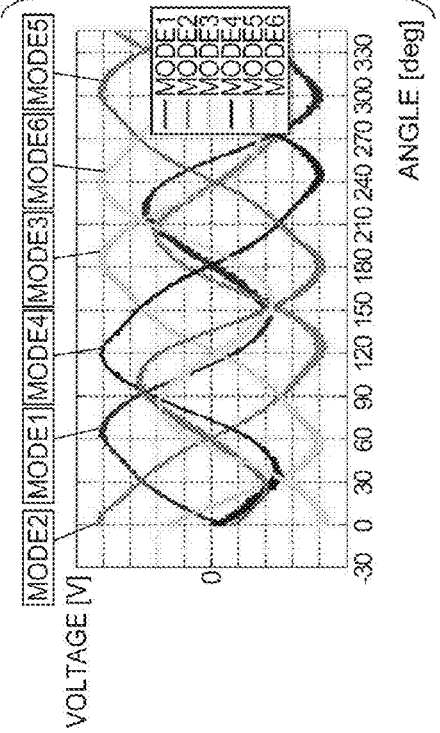

As illustrated in FIG. 26B, it is possible to obtain a characteristic in which two out of difference Sa30', difference Sa90', difference Sa150', difference Sa210', difference Sa270', and difference Sa330' clearly indicate a maximum value or a minimum value in each of the six angle regions. For example, when it is determined that difference Sa30' is a maximum value (minimum value), it is possible to detect that an initial position is in an angle region of 0~60 degrees.

Thus, in brushless motor 20 (Δ connection) having a large degree of magnetic saturation, it is possible to detect an initial position of brushless motor 20 accurately based on a maximum value or a minimum value with high determination sensitivity by using induced voltage difference of neighboring energizing modes.

Each of the technical ideas explained in the foregoing embodiments may be combined appropriately and used as long as conflict is avoided.

Further, although the contents of the present invention have been explained specifically with reference to preferred embodiments, it is obvious to one skilled in the art that various modified forms may be employed based on the basic technical ideas and teaching of the present invention.

For example, mutual comparison among differences Sa30, Sa90, Sa150, Sa210, Sa270, and Sa330 is omitted, and, when a difference between a maximum value and a minimum value of pulse induced voltage in a non-energized phase, which are acquired in each energizing mode, is a predetermined value or higher, it is possible to estimate an initial position based on a combination of an energizing mode, in which pulse induced voltage became a maximum value, and an energizing mode, in which pulse induced voltage became a minimum value.

Further, for example, when switching an energizing mode in every predetermined time for estimation of an initial position, when it is detected that an acquired pulse induced voltage is a predetermined value or higher, switching of energizing mode thereafter is canceled, and it is possible to estimate an initial position based on an energizing mode at the time of acquiring a pulse induced voltage which is a predetermined value or higher.

REFERENCE SYMBOL LIST 1 electric oil pump
2 brushless motor (star connection)
3 motor control unit
20 brushless motor (Δ connection)
212 motor driving circuit
213 control unit
213a A/D converter
213b microcomputer
215u, 215v, 215w winding wire
216 permanent magnet rotor
217a~217f switching element

The invention claimed is:

1. A device for driving a three-phase brushless motor, wherein the device performs energization between one phase, and the rest of two phases out of three phases of a brushless motor so that current in the one phase become positive and negative, and detects an initial position of the brushless motor based on a difference between induced voltage in an opened phase when current of the one phase becomes positive, and induced voltage of an opened phase when current of the one phase becomes negative.

2. The device for driving a three-phase brushless motor according to claim 1, wherein the device detects an initial position of the brushless motor based on a deviation between the induced voltage differences among a plurality of combinations in which the induced voltage differences are obtained.

3. A device for driving a three-phase brushless motor according to claim 2, wherein the device configured to drive the brushless motor by sequentially switching six energizing modes in which two phases to be energized are selected out of the three phases, wherein the device performs sequentially energization in the six energizing modes to detect each induced voltage of an opened phase, obtains the induced voltage difference in each of six combinations of the energizing modes, and detects to which one of six divided regions an initial position of the brushless motor corresponds based on the six induced voltage differences.

4. The device for driving a three-phase brushless motor according to claim 3, wherein the device obtains twelve mutual differences of induced voltage differences in respective twelve types of combinations of the six induced voltage differences, and compares the twelve differences to one another to detect to which one of twelve divided regions an initial position of the brushless motor corresponds.

5. The device for driving a three-phase brushless motor according to claim 3, wherein the device acquires induced voltage of the opened phase within a time in which rotational torque of the brushless motor is not generated.

6. The device for driving a three-phase brushless motor according to claim 3, having a structure that drives the brushless motor by sequentially switching six energizing modes in which two phases to be energized are selected out of the three phases, wherein the device selects an energizing mode at the time of start of drive of the brushless motor in accordance with an initial position of the brushless motor, and, after energization is performed for a predetermined time in the energizing mode, the device switches to a next energizing mode to start up the brushless motor.

7. The device for driving a three-phase brushless motor according to claim 3, wherein the device detects an initial position of the brushless motor based on a maximum value of induced voltage differences obtained in the respective six combinations.

8. The device for driving a three-phase brushless motor according to claim 3, wherein the device detects an initial position of the brushless motor based on a minimum value of induced voltage differences obtained in the respective six combinations.

9. The device for driving a three-phase brushless motor according to claim 3, wherein the device sets a duty ratio in energization for detection of the initial position so that a deviation of induced voltage differences among a plurality of combinations, in which the induced voltage differences are obtained, exceeds a predetermined value.

10. The device for driving a three-phase brushless motor according to claim 3, wherein, after the motor is started up in an energizing mode in accordance with an initial position of the brushless motor, the device executes the first switching of the energizing mode when it is determined that a level of induced voltage of the opened phase is a level that corresponds to energizing mode after the switching, and the device executes the second switching of the energizing mode and after when it is determined that a level of induced voltage of the opened phase is changed from a level corresponding to energizing mode before switching to a level corresponding to energizing mode after switching.

11. The device for driving a three-phase brushless motor according to claim 3, wherein, before starting drive of the three-phase brushless motor, the device applies voltage for a predetermined time in each energizing mode without rotating the three-phase brushless motor to acquire induced voltage of a non-energized phase, and detects an initial position of the three-phase brushless motor based on the acquired induced voltage.

12. The device for driving a three-phase brushless motor according to claim 1, wherein the device performs detection of an initial position based on the induced voltage differences under a condition that rotation speed of the brushless motor is within a predetermined low rotation speed area including a stopped state.

13. The device for driving a three-phase brushless motor according to claim 1, wherein the device detects an initial position of the brushless motor based on the induced voltage difference within a predetermined range.

14. The device for driving a three-phase brushless motor according to claim 13, wherein the device changes the predetermined range in accordance with temperature of the brushless motor.

15. A method for detecting an initial position of a three-phase brushless motor, wherein energization is performed between one phase, and the rest of two phases out of three phases of a brushless motor so that current in the one phase becomes positive and negative, and an initial position of the brushless motor is detected based on a difference between induced voltage of an opened phase when current of the one phase becomes positive, and induced voltage of an opened phase when current of the one phase becomes negative.

* * * * *